(12) United States Patent
Lipka et al.

(10) Patent No.: US 10,064,046 B2
(45) Date of Patent: Aug. 28, 2018

(54) COMMUNICATION TERMINAL AND METHOD FOR USING A SHARED RADIO COMMUNICATION COMPONENT

(71) Applicant: Intel IP Corporation, Santa Clara, CA (US)

(72) Inventors: Dietmar Lipka, Berg (DE); Stefan Strobl, Obermichelbach (DE); Wolfgang Wippich, Hersbruck (DE)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 15/602,184

(22) Filed: May 23, 2017

(65) Prior Publication Data

US 2017/0374544 A1    Dec. 28, 2017

(30) Foreign Application Priority Data

Jun. 24, 2016   (EP) .................................... 16176118

(51) Int. Cl.
| | |
|---|---|
| *H04W 48/18* | (2009.01) |
| *H04W 8/18* | (2009.01) |
| *H04W 76/15* | (2018.01) |
| H04W 88/06 | (2009.01) |

(52) U.S. Cl.
CPC ........... *H04W 8/183* (2013.01); *H04W 48/18* (2013.01); *H04W 76/15* (2018.02); *H04W 88/06* (2013.01)

(58) Field of Classification Search
CPC ...... H04W 8/183; H04W 48/18; H04W 88/06
USPC ........................................... 455/435.1–435.3
See application file for complete search history.

(56) References Cited

U.S. PATENT DOCUMENTS

| | | | |
|---|---|---|---|
| 9,119,173 B1 * | 8/2015 | Krishnamoorthy ... | H04W 68/02 |
| 2003/0181216 A1 * | 9/2003 | Tsai ...................... | H04W 88/06 |
| | | | 455/517 |
| 2007/0004457 A1 * | 1/2007 | Han ........................ | H04W 8/20 |
| | | | 455/558 |
| 2008/0014879 A1 * | 1/2008 | Light ........................ | H04L 5/14 |
| | | | 455/130 |
| 2011/0117965 A1 * | 5/2011 | Gong .................... | H04W 48/18 |
| | | | 455/558 |
| 2013/0130646 A1 * | 5/2013 | Xiong ................. | H04L 12/1435 |
| | | | 455/407 |

(Continued)

OTHER PUBLICATIONS

The extended European search report based on Application No. 16176118.4(5 Pages) dated Jan. 30, 2017 (Reference Purpose Only).

*Primary Examiner* — Nathan Taylor
(74) *Attorney, Agent, or Firm* — Viering, Jentschura & Partner mbB

(57) ABSTRACT

A communication terminal is described comprising a two SIMs, first components assigned to the first SIM and second components assigned to the second SIM and a shared component. A priority determiner determines, for each first component a priority of a function to be carried by the component using the shared component and determines an accumulated priority for the first SIM and determines for each second component a priority of a function to be carried by the component using the shared component and determines an accumulated priority for the second SIM and further comprises a controller configured to give access to the shared radio communication component based on the accumulated priorities.

20 Claims, 20 Drawing Sheets

(56) References Cited

U.S. PATENT DOCUMENTS

| | | | |
|---|---|---|---|
| 2015/0017962 A1* | 1/2015 | Howard | H04W 8/22 |
| | | | 455/418 |
| 2015/0099516 A1* | 4/2015 | Nayak | H04W 52/0229 |
| | | | 455/435.3 |
| 2015/0245309 A1* | 8/2015 | Nayak | H04W 60/005 |
| | | | 455/435.3 |
| 2015/0282057 A1* | 10/2015 | Li | H04B 7/0871 |
| | | | 455/552.1 |
| 2016/0029222 A1* | 1/2016 | Su | H04B 1/3816 |
| | | | 370/329 |
| 2017/0041976 A1* | 2/2017 | Van | H04L 1/18 |
| 2017/0134945 A1* | 5/2017 | Goel | H04W 76/38 |
| 2017/0318523 A1* | 11/2017 | Lindoff | H04W 48/20 |

* cited by examiner

COMMUNICATION TERMINAL AND METHOD FOR USING A SHARED RADIO COMMUNICATION COMPONENT

CROSS-REFERENCE TO RELATED APPLICATION

This application claims priority to European Patent Application Serial No. 16 176 118.4, which was filed Jun. 24, 2016, and is incorporated herein by reference in its entirety.

TECHNICAL FIELD

Embodiments described herein generally relate to communication terminals and methods for using a shared radio communication component.

BACKGROUND

Modern communication terminals such as mobile phones may have a plurality of subscriber identity modules to be able to connect to different communication networks, possibly even at the same time. However, a communication terminal may have only a single or not enough instances of a certain component, such as a single transceiver, single front end and/or single baseband, such that such a component needs to be shared between the subscriber identity modules. For this, efficient arbitration schemes are desirable.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which.

DESCRIPTION OF EMBODIMENTS

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

Figure 1:
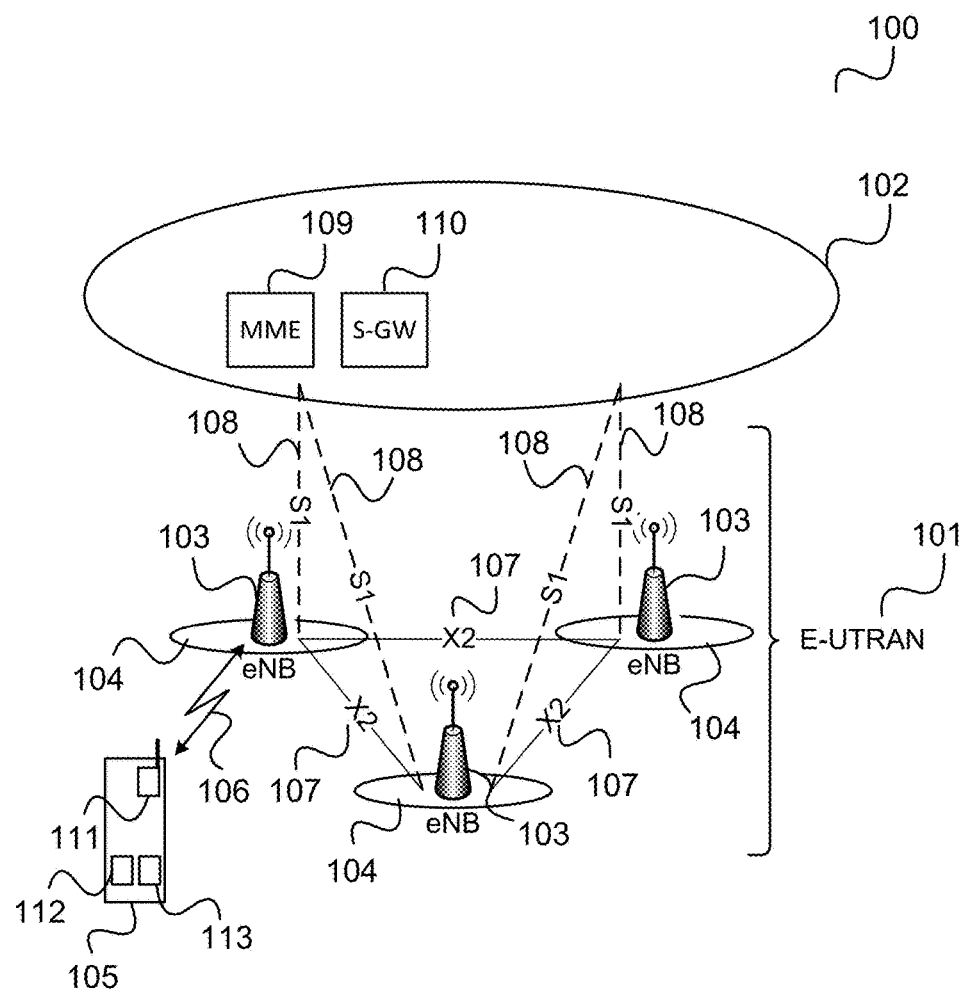
FIG. 1 shows a communication system.

FIG. 1 shows a communication system 100, e.g. an LTE (Long Term Evolution) communication system.

The communication system 100 includes a radio access network (e.g. an E-UTRAN, Evolved UMTS (Universal Mobile Communications System) Terrestrial Radio Access Network according to LTE) 101 and a core network (e.g. an EPC, Evolved Packet Core, according LTE) 102. The radio access network 101 may include base (transceiver) stations (e.g. eNodeBs, eNBs, according to LTE) 103. Each base station 103 provides radio coverage for one or more mobile radio cells 104 of the radio access network 101.

A mobile terminal (also referred to as UE, user equipment, or MS, mobile station) 105 located in one of the mobile radio cells 104 (in this example the leftmost radio cell 104) may communicate with the core network 102 and with other mobile terminals 105 via the base station providing coverage in (in other words operating) the mobile radio cell.

Control and user data are transmitted between a base station 103 and a mobile terminal 105 located in the mobile radio cell 104 operated by the base station 103 over the air interface 106 on the basis of a multiple access method.

The base stations 103 are interconnected with each other by means of a first interface 107, e.g. an X2 interface. The base stations 103 are also connected by means of a second interface 108, e.g. an S1 interface, to the core network, e.g. to an MME (Mobility Management Entity) 109, and a Serving Gateway (S-GW) 110. For example, the MME 109 is responsible for controlling the mobility of mobile terminals located in the coverage area of E-UTRAN, while the S-GW 110 is responsible for handling the transmission of user data between mobile terminals 105 and core network 102.

The radio access network 101 and the core network may support communication according to various communication technologies, e.g. mobile communication standards. For example, each base station 103 may provide a radio communication connection via the air interface between itself and the mobile terminal 105 according to LTE, UMTS, GSM (Global System for Mobile Communications), EDGE (Enhanced Data Rates for GSM Evolution) radio access. Accordingly, the radio access network 102 may operate as an E-UTRAN, a UTRAN, a GSM radio access network, or a GERAN (GSM EDGE Radio Access Network). Analogously, the core network 102 may include the functionality of an EPC, a UMTS core network or a GSM core network. The approaches described herein may also be applied to future RAT technologies such as 5G.

For uplink radio communication via the air interface 106, the mobile terminal 105 includes a radio transmitter (TX RF) 111.

The mobile terminal 105 may include an identity module 112 (e.g. implemented by a chip card) that allows the mobile terminal 105 to identify itself as a subscriber of the communication network (e.g. as an LTE subscriber) formed by the radio access network 101 and the core network 102 and thus to use the communication network as a home network.

However, the mobile terminal 105 may include a further identity module 113, i.e. may be a multi-SIM device supporting multiple SIMs. For example, the mobile terminal 105 may be a multi-SIM UE which uses the further identity module 113 to identify itself as a subscriber of the communication network of a further operator formed by a further radio access network and core network of this operator, which are not shown in FIG. 1.

A mobile terminal, e.g. based on 3GPP radio access technologies, supporting multiple SIMs allows connecting to multiple operators using the same terminal device and/or allows supporting dual connectivity to connect to different base stations for an enhanced data rate. In such a case multiple protocol stacks and multiple radio and baseband hardware instances have to operate independently and in unsynchronized manner with arbitrary time differences, timing drifts and frequency offsets. Due to cost reasons or to relax coexistence issues between multiple instances of a modem, e.g. the radio components and/or the base band processor of two SIMs, a mobile terminal may be implemented with limited connectivity in the frontend or limited number of receive and/or transmit chains. This leads to conflicting usage of radio and/or baseband resources that needs to be arbitrated between the different instances.

According to DSDA (Dual SIM Dual Active) a single instance of a radio hardware and a baseband processor may be arbitrated for separate instances of the protocol stack. To resolve conflicts each protocol stack provides interfaces and communication to all other protocol stacks on multiple layers and for each supported radio access technology. The resulting communication network within the mobile device is huge and causes extremely high effort for development and for test and verification. Especially the arbitrary mutual timing is a source of high complexity. If beside multiple stack software instances even multiple instances of radio and baseband hardware have to be controlled by communicating with each other it becomes extremely difficult to implement corresponding interfaces between hardware blocks and processor cores.

Figure 2:
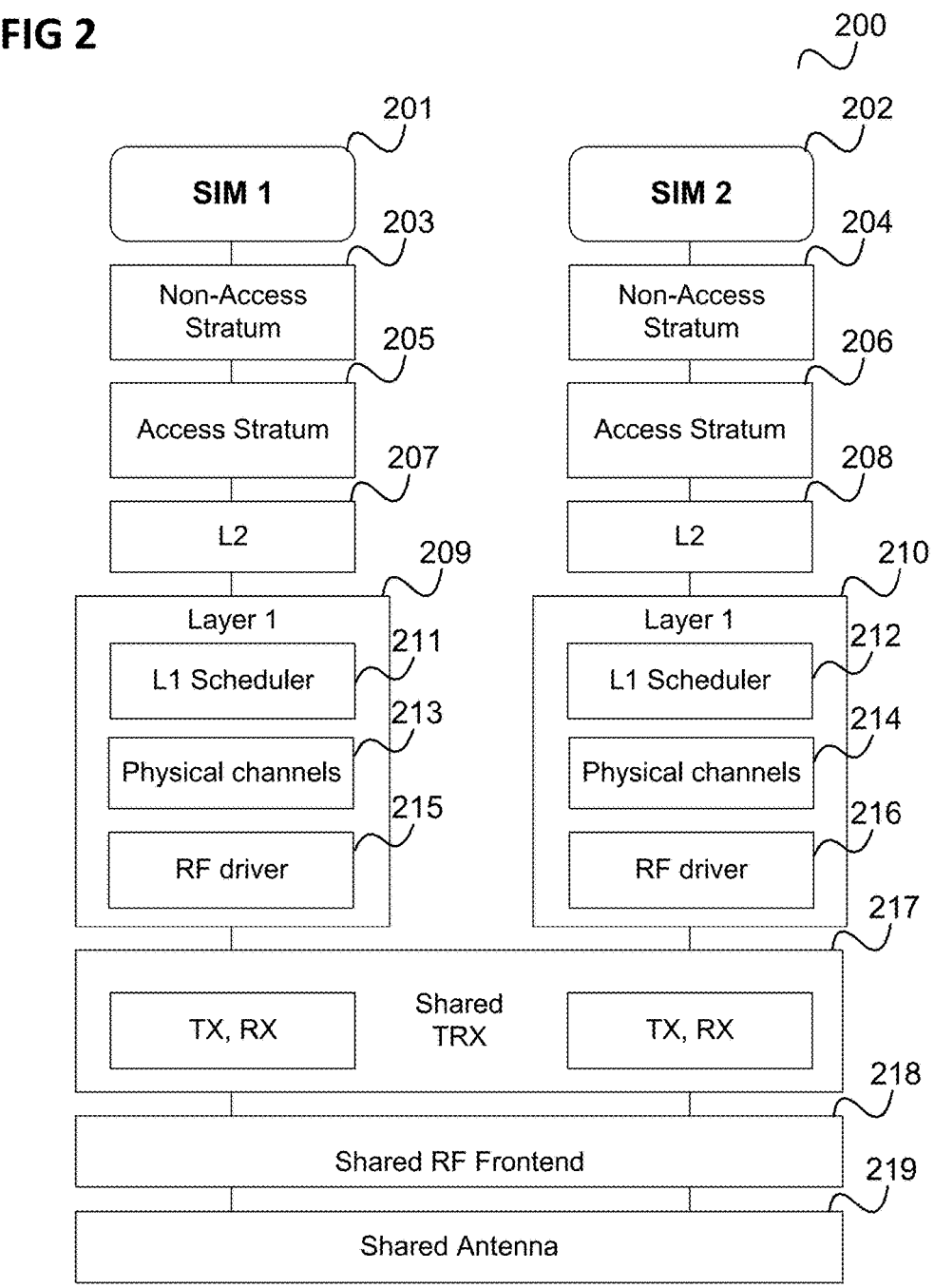
FIG. 2 shows an architecture of a mobile terminal having two SIMs for the case of partially independent layer 1 components.

FIG. 2 shows an architecture of a mobile terminal having two SIMs 201, 202 for the case of partially independent layer 1 components.

For each SIM 201, 202, there are respective non-access stratum components 203, 204, access stratum components 205, 206 and layer 2 components 207 and 208 as well as, in this example, layer 1 components 209, 210, wherein in this example, the layer 1 components 209, 210 include, for each SIM 201, 202, an L1 scheduler 211, 212, management of physical channels 213, 214 and an RF driver 215, 216. In this example, further components of layer 1 (e.g. hardware components) are shared between the first SIM 201 and the second SIM 202 including a shared transceiver 217, a shared RF frontend 218 and a shared antenna 219.

Thus, there exists a protocol stack instance and a modem instance for each SIM 201, 202 (first instance belonging to the first SIM 201 shown below the first SIM 201 and second instance belonging to the second SIM 202 shown below the second SIM 202), wherein a protocol stack instance and a modem instance may be seen to include components of for example layers 1 to 3 assigned to the respective SIM.

A layer may be understood as a layer in accordance with the OSI (Open System Interconnection) model. In the context of a radio communication system, e.g. an LTE communication system, layer 1 corresponds to the physical layer, layer 2 corresponds to the data link layer and for example includes medium access control (MAC), radio link control (RLC) and PDCP (Packet Data Convergence Protocol) and layer 3 corresponds to the network layer and includes radio resource control (RRC), IP (Internet Protocol) and the NAS.

Figure 3:
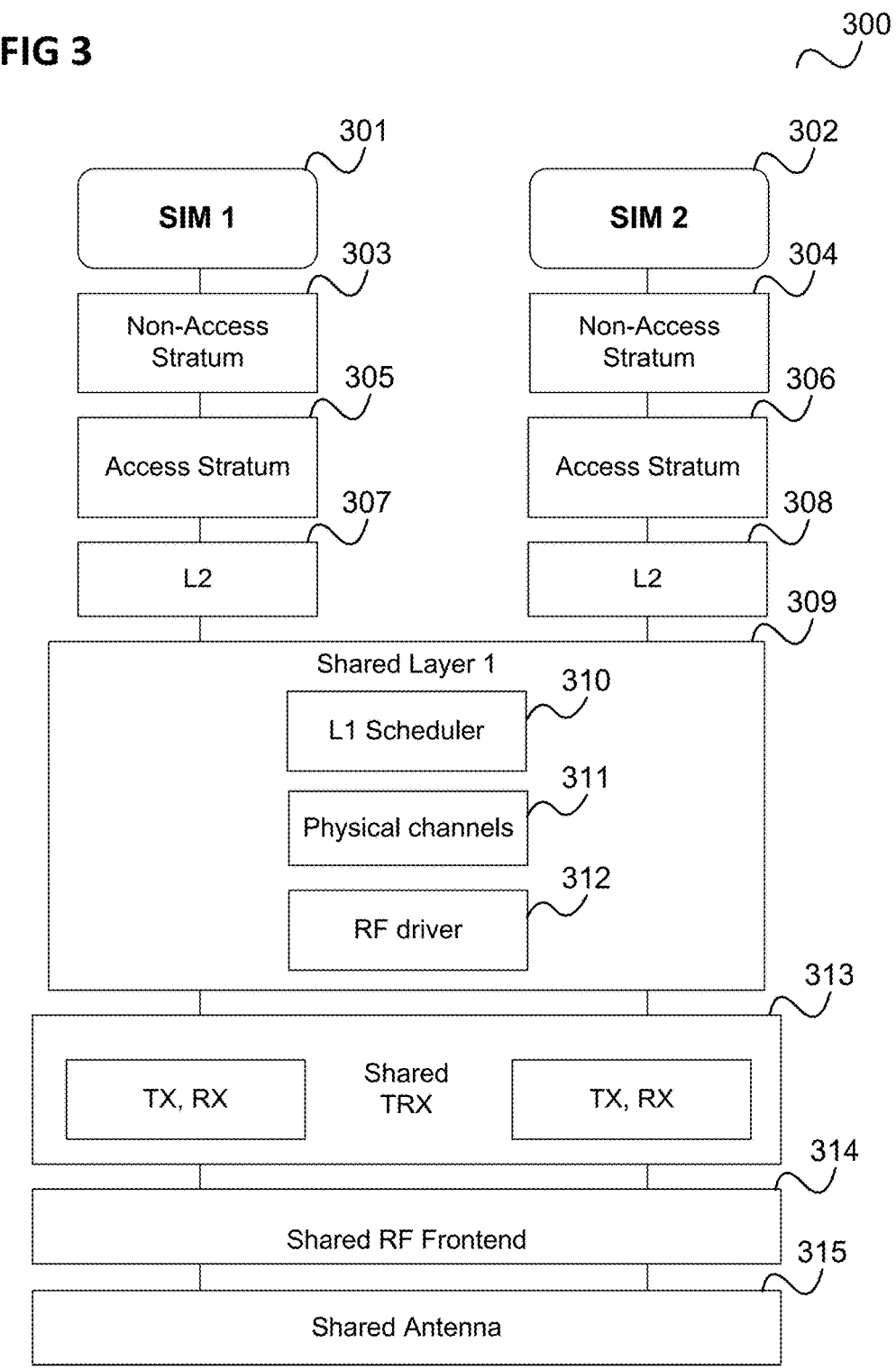
FIG. 3 shows an architecture of a mobile terminal having two SIMs for the case of shared layer 1 components.

FIG. 3 shows an architecture of a mobile terminal having two SIMs 301, 302 for the case of shared layer 1 components.

Similarly to the example of FIG. 2, for each SIM 301, 302, there are separate non-access stratum components 303, 304, access stratum components 305, 306 and layer 2 components 307 and 308. However, layer 1 components 309 are shared between the SIMs 301, 302 including an L1 scheduler 310, management of physical channels 311 and an RF driver 312. As in the example of FIG. 2, further components of layer 1 are shared between the first SIM 301 and the second SIM 302 including a shared transceiver 313, a shared RF frontend 314 and a shared antenna 315.

Conflicts may occur in the shared layers. The architecture according to FIG. 2 may exhibit conflicts in the transceiver 217, i.e. by shared usage of transmit or receive chains or both, or the front end 218, i.e. path or coexistence conflicts. The architecture according to FIG. 3 additionally exhibits possible conflicts due to shared L1 components 309.

To handle a conflict the arbitration of a shared resource, e.g. transmitter, receiver, path, local oscillator, etc., needs to be controlled in a suitable way to keep performance losses as low as possible. This may be achieved by communication interfaces between layers of the independent protocol stack instances in a horizontal manner.

In the following, in contrast, a vertical approach is described which allows a decision metric evolution in both protocol stacks (i.e. the protocol stack for the first SIM 201, 301 and the protocol stack for the second SIM 202, 302) completely independent from each other. The independent decision metrics are finally compared at the layer (or at the level of the component within a layer, e.g. transceiver level in the physical layer) where the conflict materializes to finally decide which instance may use the shared resource.

Figure 4:
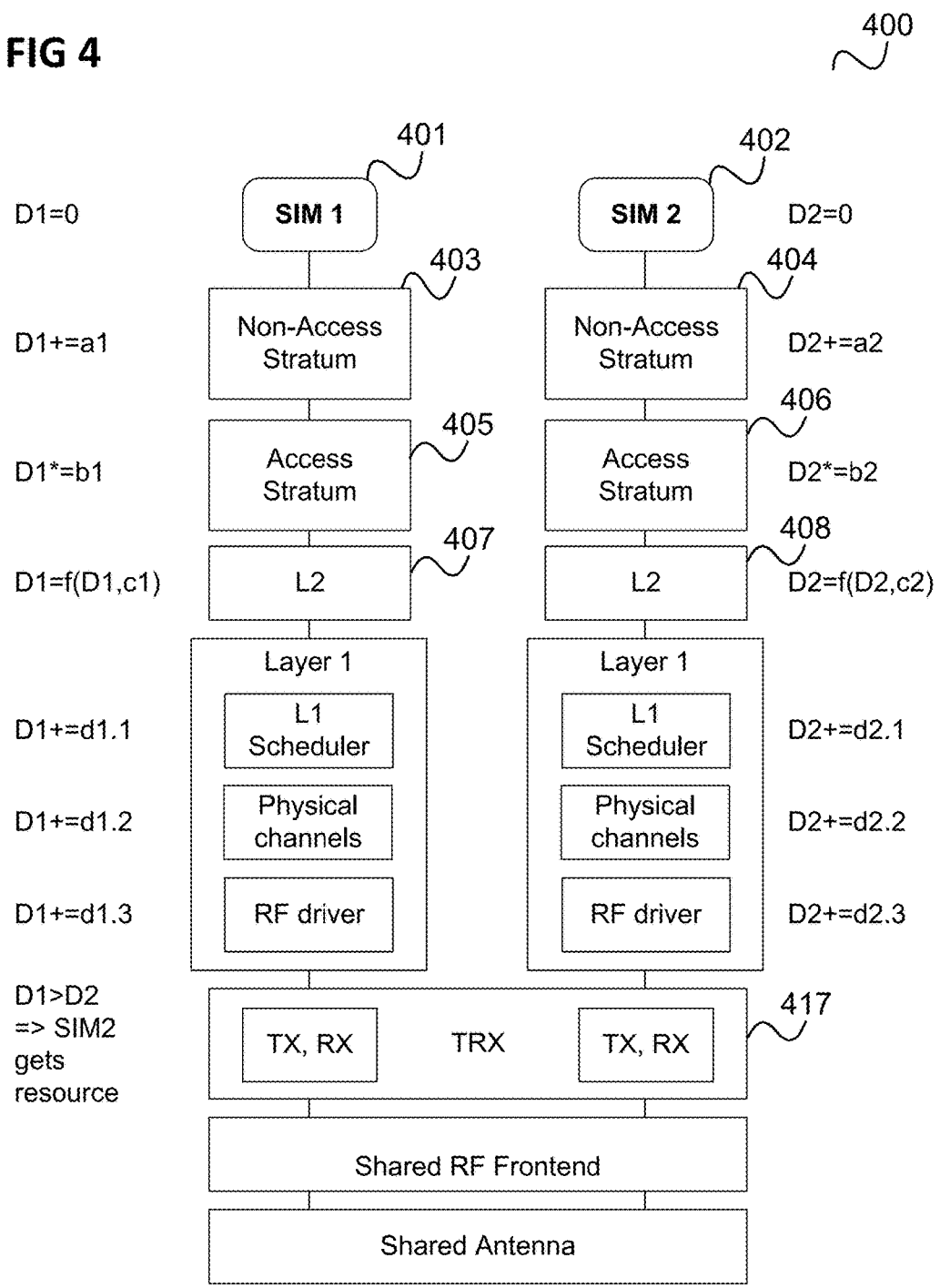
FIG. 4 illustrates in an example for the architecture of FIG. 2 how decisions for both SIMs of FIG. 2 may evolve.

FIG. 4 illustrates in an example for the architecture of FIG. 2 how the decisions on both protocol stack instances (first protocol stack for first SIM 401 and second protocol stack for second SIM 402) may evolve. The decision evolution may start with a base value on the highest layer, for example 0, such that in this example for the first protocol stack the metric starts as $D1=0$ and for the second protocol stack the metric starts as $D2=0$. Each layer (or level or component within a layer, e.g. the L1 scheduler within layer 1) modifies the decision metric by a suitable predefined function, for example a simple addition of metrics. Any other function may be chosen, like multiplication or any function that provides an accumulation of the decision metric. For example the same function is used on the correspondingly same layers on both (protocol stack) instances. However, they may also differ if one instance should be prioritized over the other or there are functional differences, e.g. in case of different radio access technologies.

The contribution of the layers or modem or protocol stack components to the decision metric, in FIG. 4 referred to as parameters a1, a2, b1, b2, etc. depends on certain criteria, for example on the type of procedure triggered by higher layers 403 to 408, the physical channel type set up by L1 or the order of a retransmission controlled by L2.

The accumulation of the metrics is done down to the layer (or level within a layer) where the conflict occurs. In the example of FIG. 4, the conflict occurs in the shared transceiver 417 and the final metric D1 for the first SIM 401 and the final metric for the second SIM 402 accumulate to the values:

$$D1=f(a1*b1,c1)+d1.1+d1.2+d1.3$$

$$D2=f(a2*b2,c2)+d2.1+d2.2+d2.3$$

A comparison of the two metrics finally decides on which instance may use the shared resource.

In the following, the usage of metrics in protocol stacks is described in more detail.

Hardware components (e.g. signal processors, transceivers, front end) and software components (e.g. protocol stack layers) of a telecommunication system are typically operating hierarchically, i.e. define layers, where layer l is calling services of the next lower layer l–1. For this, models are given in the following.

Figure 5:
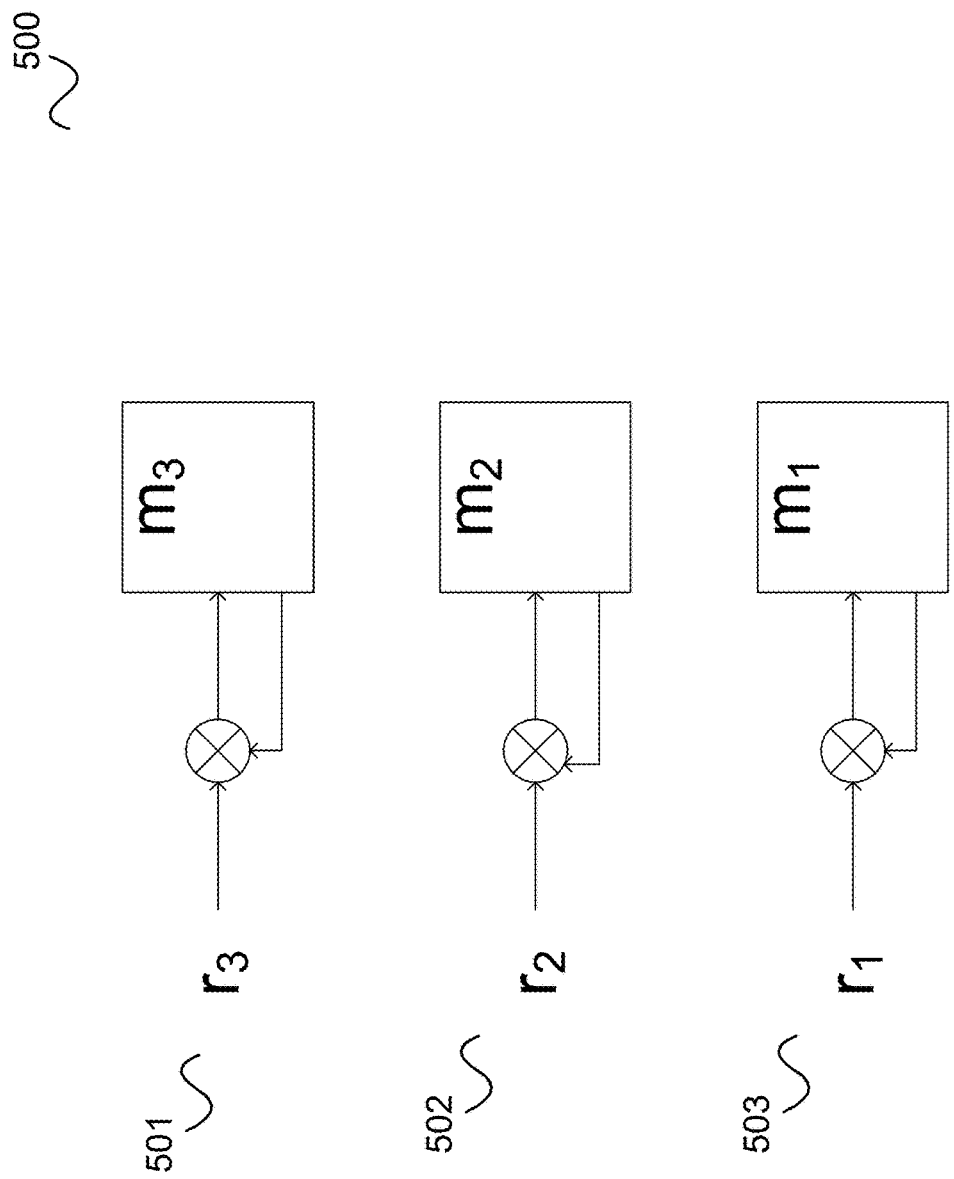
FIG. 5 shows a model for three layers.

FIG. 5 shows a model 500 for 3 layers 501, 502, 503.

The lth layer can be considered as an automaton $(m_l, r_l)$ with states $m_l$ and the triggering transition signals $r_l$ which generate a mapping, indicated by ⊗, from $m_l$ to $m_l$.

Figure 6:
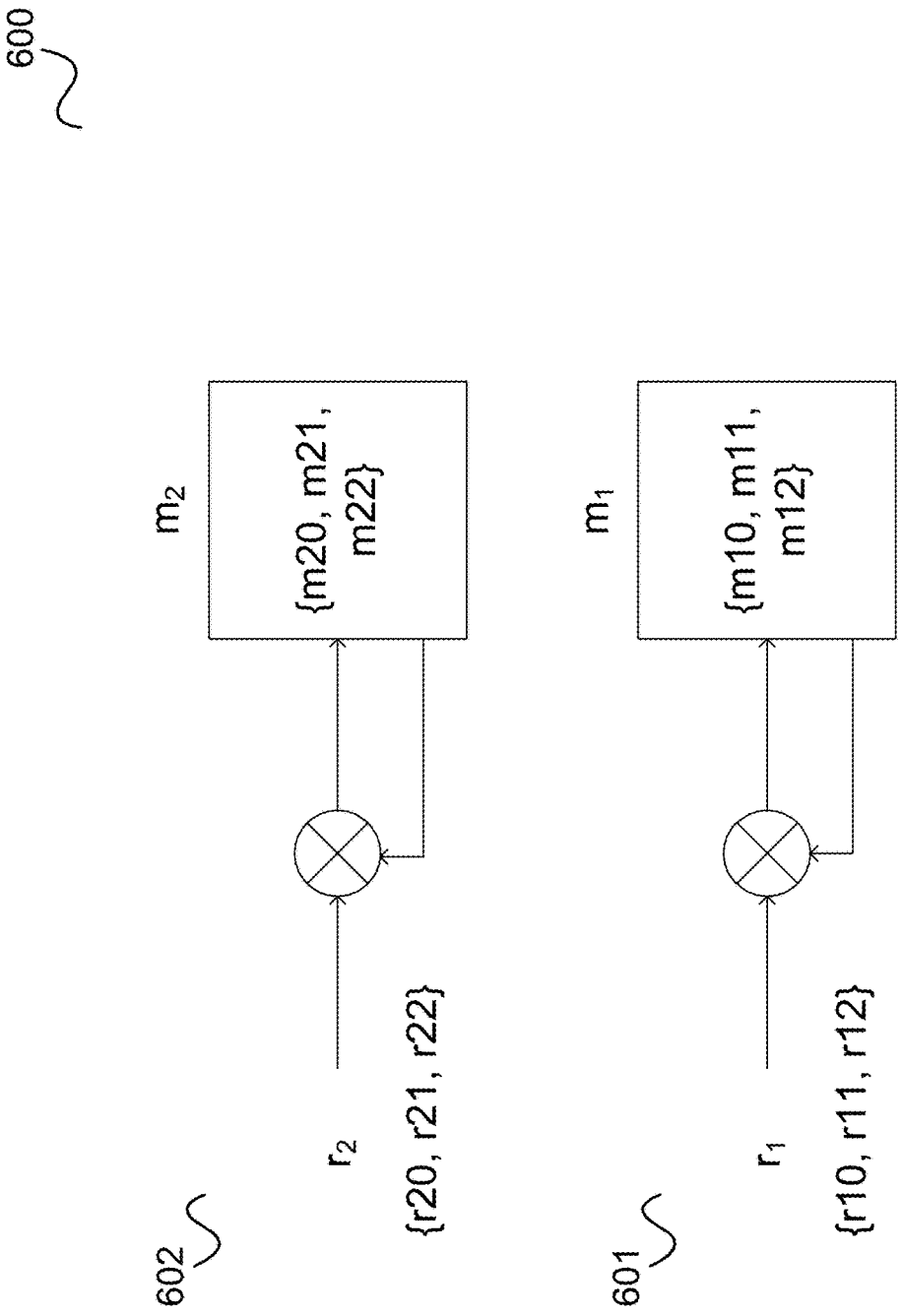
FIG. 6 shows an example with two layers of entities.

FIG. 6 shows an example with two layers of entities: a first entity 601 which is managing radio resources, in the following referred to as physical layer, and a second entity 602 which is managing connections, in the following referred to as connection layer.

For the connection layer 602, there are three types of requests: establish a circuit connection, establish a packet connection and release all connections, which are in this example coded (in that order) as $r_2=\{r20, r21, r22\}$. For simplicity it is assumed that the connection layer 602 can only operate one connection type at a time. It has the following states: not connected, circuit connected and packet connected which are in this example coded (in that order) as $m_2=\{m20, m21, m22\}$. A packet connection can be upgraded to a circuit connection, but a circuit connection cannot be modified.

Tables 1 to 6 show the coding of request types, states and the resulting automaton table for the layers 601, 602.

In the automaton tables 3 and 6 each column stands for an initial state, each row for a transition and the field identified by this column and row contains the respective end state (e.g. the automaton in table 3 contains a transition r21 from state m20 to state m21).

TABLE 1

| signal $r_2$ name | Value |
|---|---|
| release | r20 |

TABLE 1-continued

| signal $r_2$ name | Value |
|---|---|
| circuit establish | r21 |
| packet | r22 |

TABLE 2

| state $m_2$ name | value |
|---|---|
| not connected | m20 |
| circuit | m21 |
| packet | m22 |

TABLE 3

| ⊗ | m20 | m21 | m22 |
|---|---|---|---|
| r20 | m20 | m20 | m20 |
| r21 | m21 | m21 | m21 |
| r22 | m22 | m21 | m22 |

TABLE 4

| signal $r_1$ name | value |
|---|---|
| radio off | r10 |
| receive on | r11 |
| transmit on | r12 |

TABLE 5

| state $m_1$ name | value |
|---|---|
| Idle | m10 |
| Receiving | m11 |
| transmitting | m12 |

TABLE 6

| ⊗ | m10 | m11 | m12 |
|---|---|---|---|
| r10 | m10 | m10 | m10 |
| r11 | m11 | m11 | |
| r12 | m12 | | m12 |

For the physical layer 601, a half-duplex operation is assumed, i.e. the system (e.g. mobile terminal) can be either idle, receiving or transmitting, but not receiving and transmitting at the same time. Signals which trigger these state transitions are: turning the receiver on, turning the transmitter on or turning the radio off. The radio must be turned off in between when switching between reception and transmission.

Operation of the connection layer and physical layer is coupled: only if the connection layer has a connection allocated, the physical layer may be transmitting. This is for simplicity not shown in the model of FIG. 6 and tables 1 to 6.

In a multi SIM system the hardware and software components exist typically in multiple instances with one instance per SIM. This is illustrated in FIG. 7.

Figure 7:
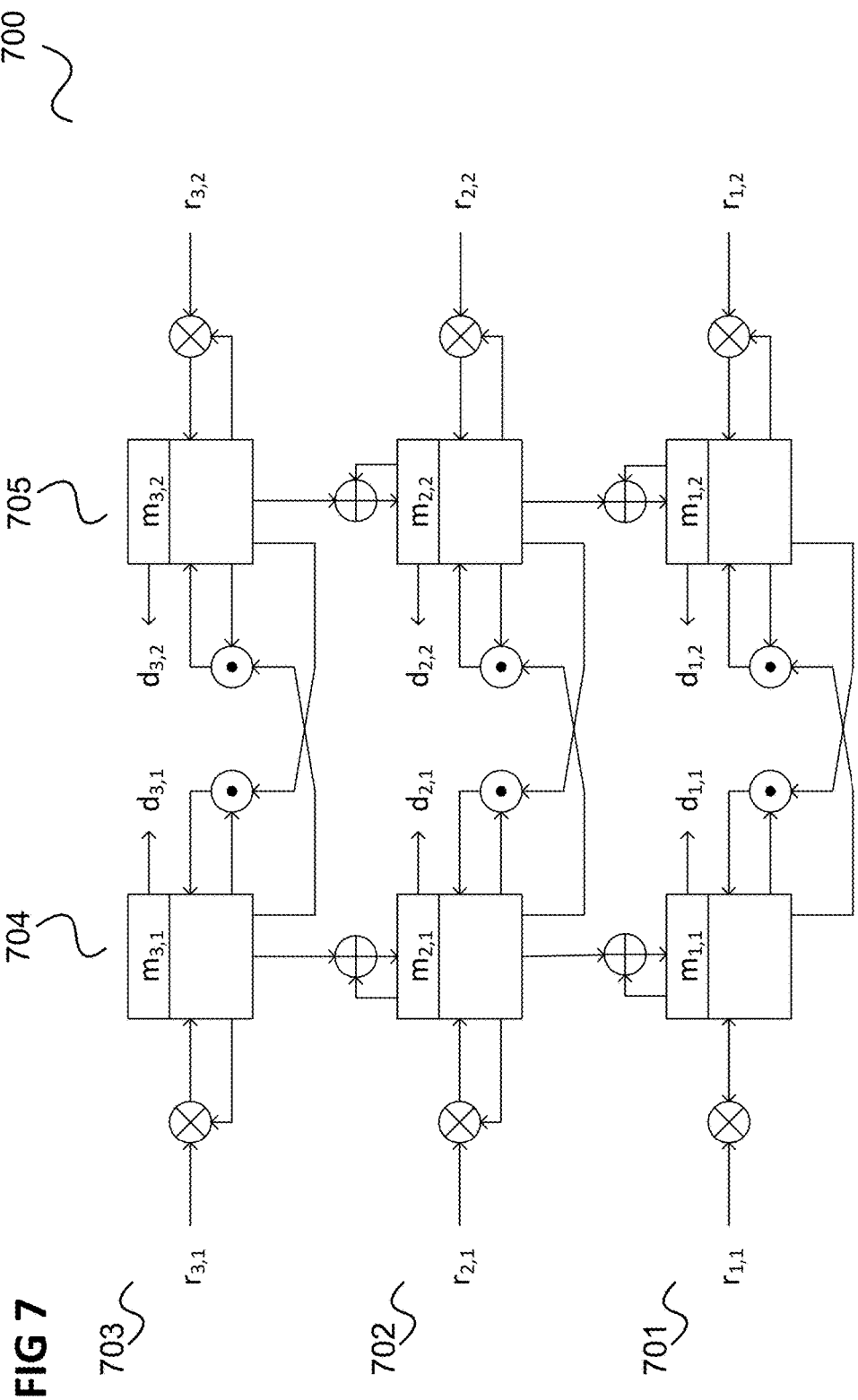
FIG. 7 shows an example with three layers and two SIMs.

FIG. 7 shows an example with three layers 701, 702, 703 and two SIMs corresponding to a first column 704 and a second column 705. The states (and corresponding metrics)

m, transitions r and decision functions d are indexed using indexes which first indicate the layer and then the SIM number. For example, $m_{3,1}$ is a state of the $3^{rd}$ layer of the first SIM and $m_{3,2}$ a state of the $3^{rd}$ layer of the second SIM.

A special property of a multi SIM device is that hardware or software components of a given layer manage resources which need to be shared by the component instances of the SIMs, but are not always sufficiently available for the SIM instances. Therefore, resource allocation strategies are used.

In the following examples, signals of hardware or software components are reused for interpretation as resource requests $r_{l,i}$ and states of hardware or software components may be reused to define metrics $m_{l,i}$. Metrics are combined in the most advantageous way and used for a decision on resource usage by a decision function $d_{l,i}$.

For simplicity of implementation, the metrics can, but need not, be small integer values.

Typically, the metric does not change during certain time intervals, i.e.

$$\exists t_{l,j}, t_{l,j+1}: \forall t: t_{l,j} \leq t \leq t_{l,j+1}: m_{l,i}(t_{l,j}) = m_{l,i}(t_{l,j+1})$$

Furthermore, those time intervals with same metric values typically get smaller at the next lower layer:

$$(\forall t: t_{l+1,j} \leq t \leq t_{l+1,j+1}: m_{l,i}(t_{l+1,j}) = m_{l,i}(t_{l+1,j+1})) \wedge (\forall t: t_{l,k} \leq t \leq t_{l,k+1}: m_{l,k}(t_{l,k}) = m_{l,k}(t_{l,k+1})) \Rightarrow (t_{l+1,j} \leq t_{l,k}) \wedge (t_{l,k+1} \leq t_{l+1,j+1})$$

Combinations of the metrics are either the feedback automaton relation ⊙ or the layer-to-layer mapping ⊕.

The feedback relation ⊙ maps for the first SIM a pair of metric values $(m_{l,1}, m_{l,2})$ to $m_{l,1}$, while it maps for the second SIM a pair of metric values $(m_{l,1}, m_{l,2})$ to $m_{l,2}$. It can be extended to more than two SIMs analogously.

An alternative implementation is to add a layered arbitration hardware or software component between both SIM components of a layer. This allows keeping the automatons unchanged while the arbitration component is a further automaton.

On top, transitions from a layer l to the next lower layer l−1 may be introduced. These can be considered as a coupling of automatons $(m_l, r_l)$ and $(m_{l-1}, r_{l-1})$, where a state change of the lth layer state $m_l$ triggers a change of the l−1th layer state $m_{l-1}$. This can also be interpreted as an operation ⊕ which maps $(m_l, m_{l-1})$ to $m_{l-1}$. With the layer-to-layer transition information can be forwarded to the next lower layer which is typically not present there, as it is not needed for scheduling.

An alternative implementation of ⊕ is to trigger changes in the automaton $(m_l, r_l)$ not by a change of the state of the l−1th layer $m_{l-1}$ but by a transition $r_{l-1}$ of the automaton of the l−1th layer.

The decision function $d_{l,i}$ maps metric values to a Boolean resource grant value of the set { true, false}.

The feedback relation does not need to exist on every layer. Furthermore, the layer-to-layer relation needs not to exist between all layers.

Figure 8:
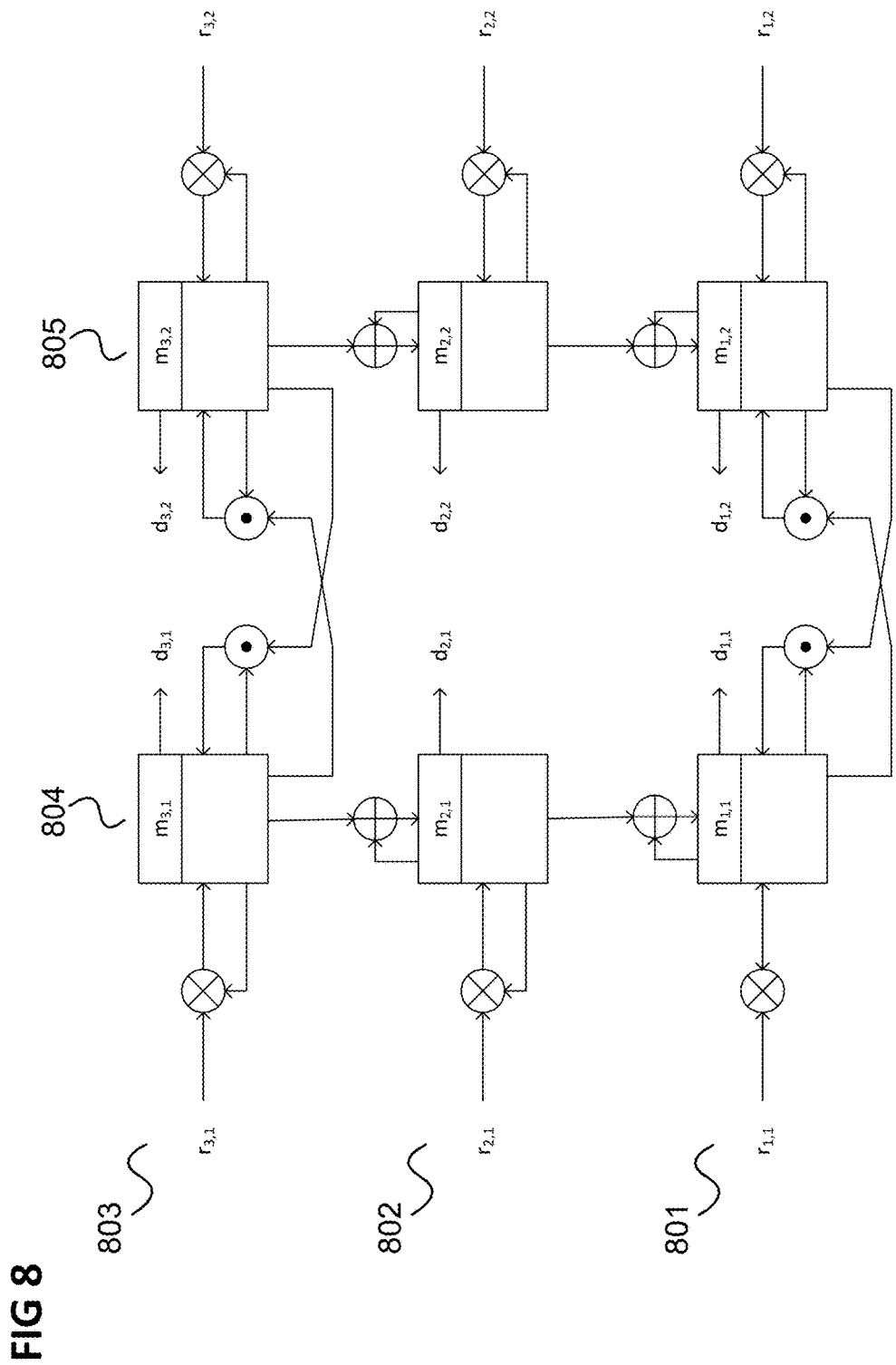
FIG. 8 shows an example with three layers and two SIMs without feedback relation on the second layer.

FIG. 8 shows an example with three layers 801, 802, 803 and two SIMs corresponding to a first column 804 and a second column 805 without feedback relation ⊙ on the second layer 802.

Figure 9:
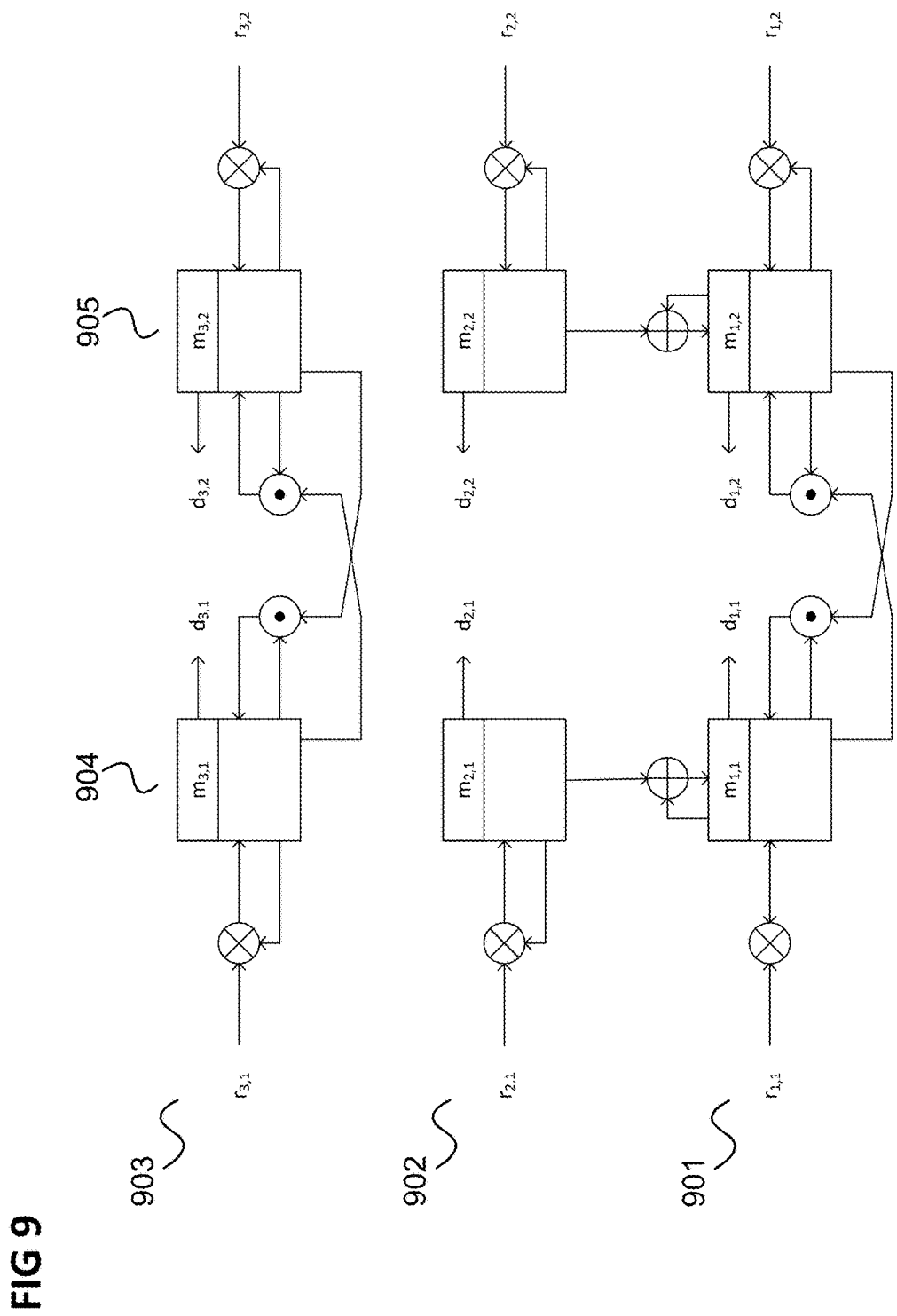
FIG. 9 shows an example with three layers and two SIMs without feedback relation on the second layer and without layer-to-layer mapping between the third layer and the second layer.

FIG. 9 shows an example with three layers 901, 902, 903 and two SIMs corresponding to a first column 904 and a second column 905 without feedback relation ⊙ on the second layer 902 and without layer-to-layer mapping ⊕ between the third layer 903 and the second layer 902.

The metric-based approach described herein allows implementing scheduling of hierarchical resources in a multi SIM system, where communication between SIM instances is only possible on the lowest layer. This can be achieved by propagating metric values to the next lower layer and combine them there. A possible system which makes use of that is illustrated in FIG. 10.

Figure 10:
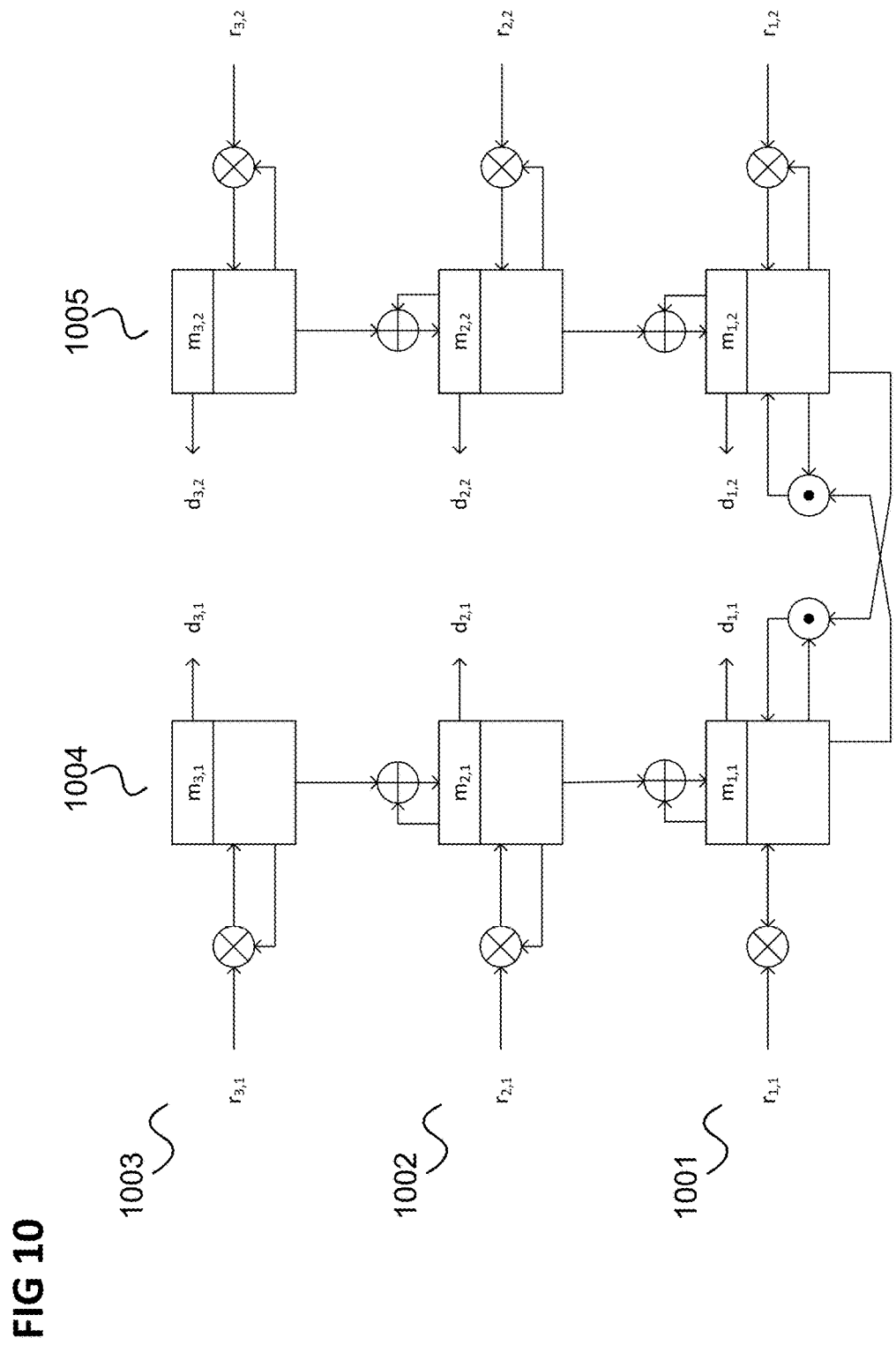
FIG. 10 shows an example with three layers and two SIMs without feedback relation on the third layer and the second layer.

FIG. 10 shows an example with three layers 1001, 1002, 1003 and two SIMs corresponding to a first column 1004 and a second column 1005 without feedback relation ⊙ on the third layer 1003 and the second layer 1002.

While the system illustrated in FIG. 10 still allows achieving all scheduling semantics as those of a system that uses communication on each layer, the system of FIG. 10 also allows the implementation of more advanced scheduling strategies implemented. This is detailed in the following two examples.

In the following, an example with contention is described with reference to FIG. 11.

Figure 11:
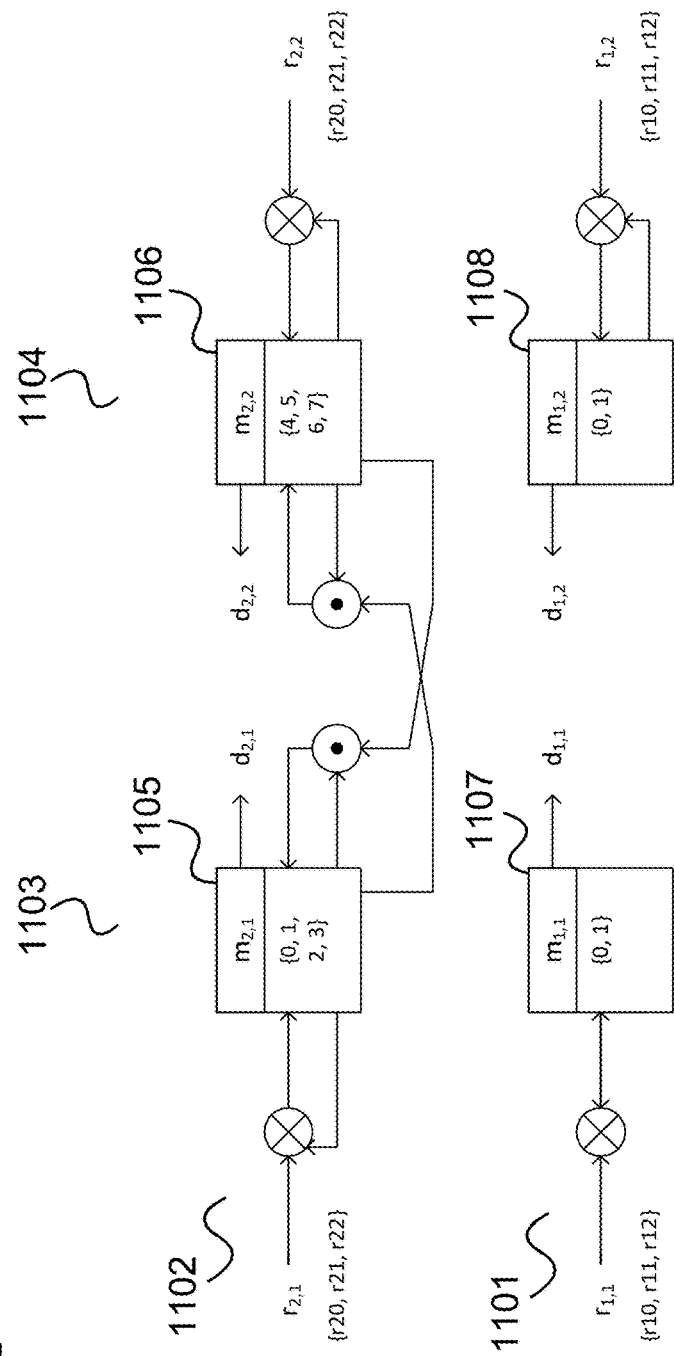
FIG. 11 shows an example with two layers and two SIMs corresponding to a first column and a second column.

FIG. 11 shows an example with two layers 1101, 1102 and two SIMs corresponding to a first column 1103 and a second column 1104.

The architecture of FIG. 11 can be seen as an extension of the single SIM example of FIG. 6 to a dual SIM device. Accordingly, the first layer 1101 is for example the physical layer 601 of FIG. 6 and the second layer 1102 is for example the connection layer 602 of FIG. 6, wherein there are two instances of each component, i.e. two connection layer instances 1105, 1106 and two physical layer instances 1107, 1108.

It is assumed that only one instance 1105, 1106 of the connection layer 1102 can have a circuit connection at a time, while both instances 1105, 1106 can have a packet connection. This can be seen to be equivalent to allocating a single circuit connection resource and two packet connection resources. If the circuit connection resource could not be allocated for simplification another request is required in this example once the resource becomes free. Communication between both instances of the connection layer is needed in order to allocate resources.

For the physical layer 1101, it is assumed that the transceiver hardware supports parallel reception of both physical layer instances, but transmission is only possible for a single instance. Accordingly, the physical layer metrics do not need to distinguish between idle state and receiving state. It is further assumed that the transmission resource is scheduled on a preemptive basis. This does not require a feedback relation for the physical layer.

Coding of the metrics is derived from the component states and additionally considers the SIM instance. Furthermore, additional metric values $m_{2,1}=3$ and $m_{2,2}=7$ for circuit connection suspended are introduced. They correspond to the case where the respective other instance has the circuit connection allocated.

Tables 7 to 10 show the metric values and decision function values for the connection layer instances 1105, 1106 and the physical layer instances 1107, 1108.

TABLE 7

| state $m_{2,1}$ name | metrics $m_{2,1}$ | decision $d_{2,1}$ |
| --- | --- | --- |
| not connected | 0 | false |
| circuit connected | 1 | true |
| packet connected | 2 | true |
| circuit connection | 3 | false |

TABLE 8

| state $m_{2,2}$ name | metrics $m_{2,2}$ | decision $d_{2,2}$ |
|---|---|---|
| not connected | 4 | false |
| circuit connected | 5 | true |
| packet connected | 6 | true |
| circuit connection | 7 | false |

TABLE 9

| state $m_{1,1}$ name | metrics $m_{1,1}$ | decision $d_{1i}$ |
|---|---|---|
| Idle | 0 | false |
| Receiving | 0 | true |
| Transmitting | 1 | true |

TABLE 10

| state $m_{1,2}$ name | metrics $m_{1,2}$ | decision $d_{1i}$ |
|---|---|---|
| Idle | 0 | false |
| Receiving | 0 | true |
| transmitting | 1 | true |

The feedback automaton transitions for the connection layer of SIM 1 and SIM 2 are shown in tables 11 and 12. An automaton transition is triggered whenever an input changes its value.

TABLE 12

| ⊙ | 4 | 5 | 6 | 7 |
|---|---|---|---|---|
| 0 | 4 | 5 | 6 | 7 |
| 1 | 7 |   | 7 | 7 |
| 2 | 4 | 5 | 6 | 7 |
| 3 | 4 | 5 | 6 | 7 |

TABLE 11

| ⊙ | 0 | 1 | 2 | 3 |
|---|---|---|---|---|
| 4 | 0 | 1 | 2 | 3 |
| 5 | 3 |   | 3 | 3 |
| 6 | 0 | 1 | 2 | 3 |
| 7 | 0 | 1 | 2 | 3 |

Figure 12:
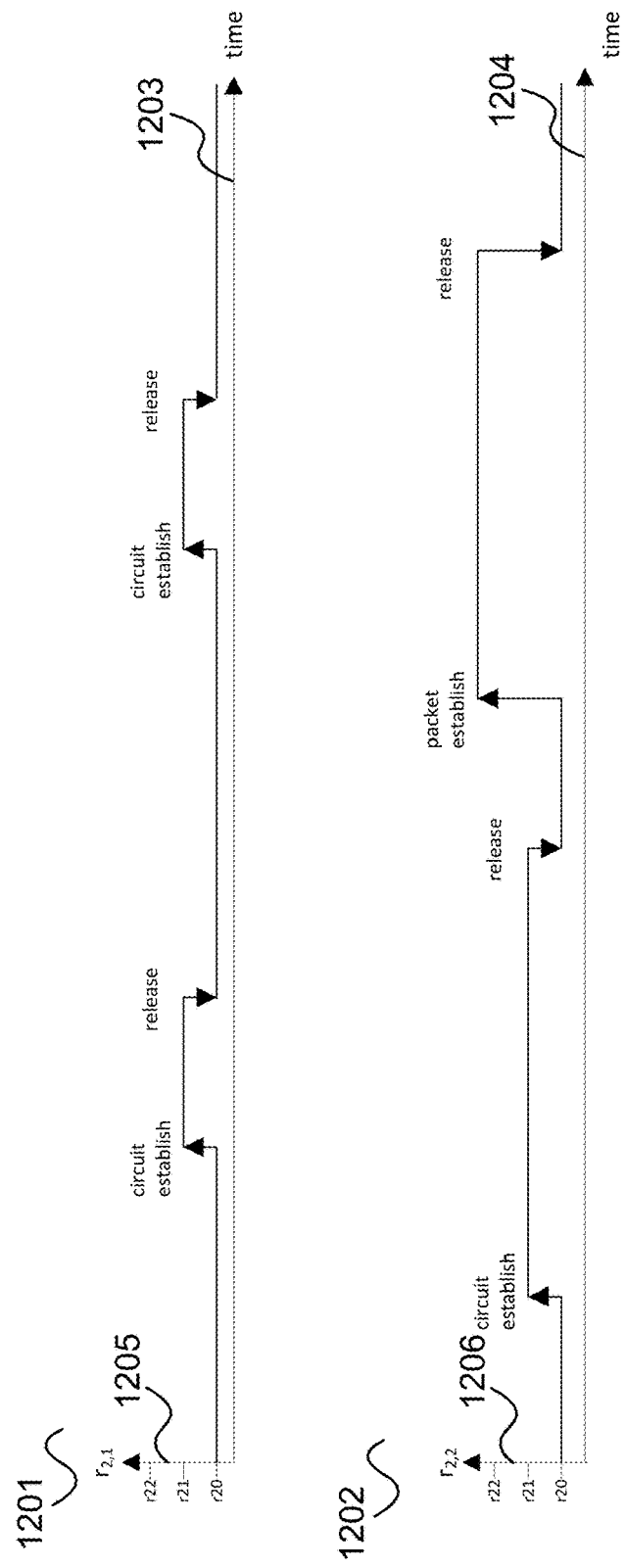
FIG. 12 shows an example for the timing sequences of connection layer requests of the first SIM and of the second SIM of FIG. 11.

FIG. 12 shows an example for the timing sequences of connection layer requests of the first SIM in a first diagram 1201 and of the second SIM in a second diagram 1202.

Both diagrams 1201, 1202 follow the same time scale, wherein time increases from left to right along the horizontal axes 1203, 1204 and the requests are indicated in accordance with the vertical axes 1205, 1206.

Figure 13:
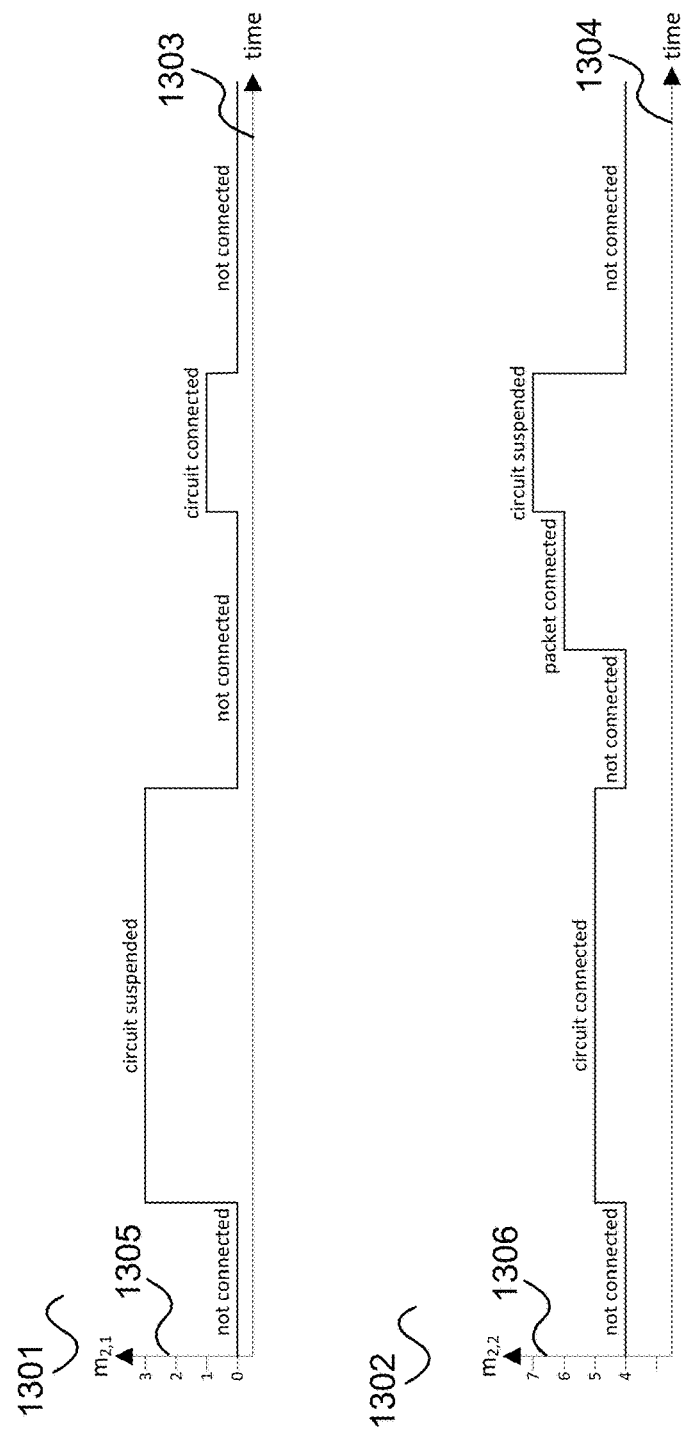
FIG. 13 shows the resulting connection layer metric values of the first SIM and of the second SIM.

FIG. 13 shows the resulting connection layer metric values of the first SIM in a first diagram 1301 and of the second SIM in a second diagram 1302.

Time increases from left to right along the horizontal axes 1303, 1304 in accordance with the same time scale as in FIG. 12 and the metric values are indicated in accordance with the vertical axes 1305, 1306 in accordance with tables 7 and 8.

Figure 14:
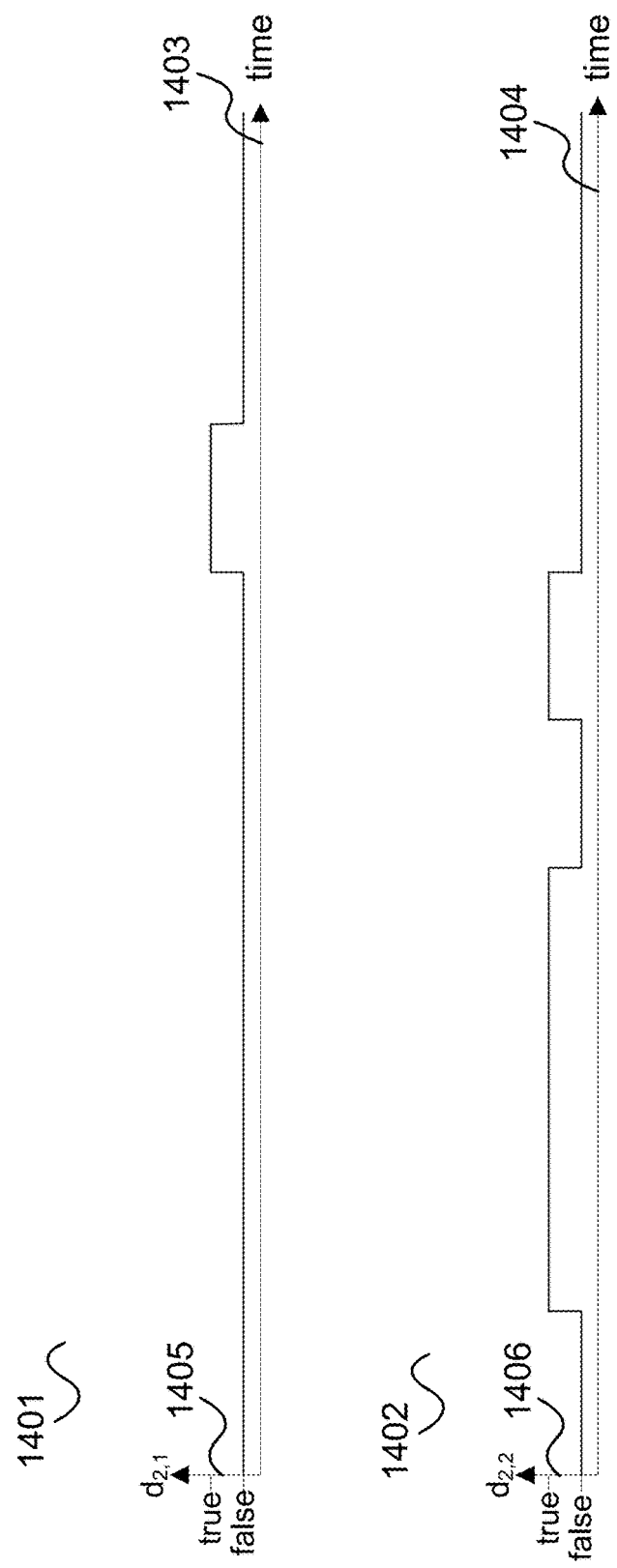
FIG. 14 shows resulting values of the allocation decision function of the first SIM and of the second SIM.

FIG. 14 shows resulting values of the allocation decision function of the first SIM in a first diagram 1401 and of the second SIM in a second diagram 1402.

Time increases from left to right along the horizontal axes 1403, 1404 in accordance with the same time scale as in FIGS. 12 and 13 and the decision function values are indicated in accordance with the vertical axes 1405, 1406 in accordance with tables 7 and 8.

From the diagrams of FIGS. 12 to 14 the following regarding single-layer scheduling as according to FIG. 11 becomes apparent:

(1) Scheduling without considering the physical resource will block further circuit connections of the other SIM, even if the transmit bursts do not overlap.
(2) The assumed release of a packet connection whenever a circuit connection on the other SIM is established can be circumvented by only considering physical layer transmit requests. Even if the transmission of both SIMs would overlap, it is thus possible to restore the packet connection if the circuit connection of the other SIM has ended.

In the following, an example with contention and communication avoidance is described with reference to FIG. 15.

Figure 15:
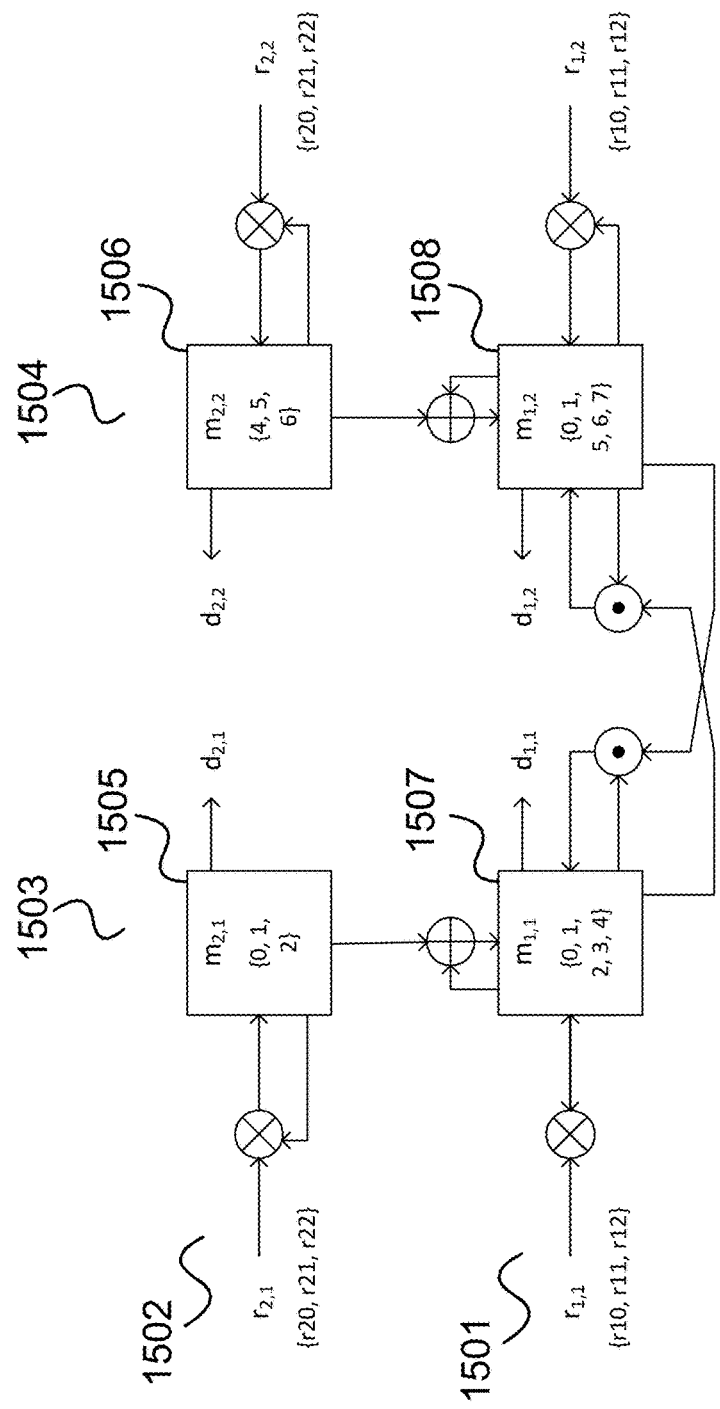
FIG. 15 shows an example with two layers and two SIMs.

FIG. 15 shows an example with two layers 1501, 1502 and two SIMs corresponding to a first column 1503 and a second column 1504.

In the example of FIG. 15, the first layer 1501 is the physical layer 1101 of FIG. 11 and the second layer 15021 is the connection layer 11021 of FIG. 11 which means that there are two connection layer instances 1505 and 1506 equivalent to 1105 and 1106 and the two physical layer instances 1507 and 1508 equivalent to 1107 and 1108.

In contrast to FIG. 11, in the FIG. 15 example, inter-SIM communication is avoided on all layers except for the lowest layer 1501 (it is also avoided on layers above the connection layer 1502 not illustrated in FIG. 15).

Tables 13 and 14 show the metric values and decision function values for the physical layer instances 1507 and 1508 which can be seen to be extended or modified, respectively to tables 9 and 10.

TABLE 13

| state $m_{1,1}$ name | metrics $m_{1,1}$ | decision $d_{1,1}$ |
|---|---|---|
| Idle | 0 | false |
| Receiving | 0 | true |
| transmitting | 1 |   |
| packet transmitting | 2 | true |
| circuit transmitting | 3 | true |
| circuit suspended | 4 | false |

TABLE 14

| state $m_{1,2}$ name | metrics $m_{1,2}$ | decision $d_{1,2}$ |
|---|---|---|
| Idle | 0 | false |
| Receiving | 0 | true |
| transmitting | 1 |   |
| packet transmitting | 5 | true |
| circuit transmitting | 6 | true |
| circuit suspended | 7 | false |

The combination operation ⊕ of the metrics of a connection layer instance, e.g. 1505, and a physical layer instance, e.g. 1507, forwards information about the connection type—circuit or packet connection—to the physical layer instance, e.g. 1507, assuming that it is not yet contained in the state of the physical layer instance, e.g. 1507.

An example for the definition of the operation ⊕ is shown in the tables 15 and 16. The columns stand for initial metric values of $m_1$, the rows for metric values $m_2$. The fields defined by these rows and columns contain the final metric values of $m_1$. Table 15 applies for the first SIM and table 16 applies for the second SIM.

TABLE 15

| ⊕ | 0 | 1 |
|---|---|---|
| 0 | 0 | 1 |
| 1 | 0 | 3 |
| 2 | 0 | 2 |

TABLE 16

| ⊕ | 0 | 1 |
|---|---|---|
| 4 | 0 | 1 |
| 5 | 0 | 6 |
| 6 | 0 | 5 |

The feedback relation ⊙ of the physical layer 1501 achieves prioritization of circuit connected transmission over packet connected transmission by suspending packet transmission. Its transitions are given in tables 17 and 18, wherein table 17 applies for the first SIM and table 18 applies for the second SIM.

TABLE 17

| ⊙ | 0 | 1 | 2 | 3 | 4 |
|---|---|---|---|---|---|
| 0 | 0 | 1 | 2 | 3 | 4 |
| 1 | 0 | 1 | 2 | 3 | 4 |
| 5 | 0 | 1 | 2 | 3 | 4 |
| 6 | 4 | 4 | 4 | 4 | 4 |
| 7 | 0 | 1 | 2 | 3 |   |

TABLE 18

| ⊙ | 0 | 1 | 5 | 6 | 7 |
|---|---|---|---|---|---|
| 0 | 0 | 1 | 5 | 6 | 7 |
| 1 | 0 | 1 | 5 | 6 | 7 |
| 2 | 0 | 1 | 5 | 6 | 7 |
| 3 | 7 | 7 | 7 | 7 | 7 |
| 4 | 0 | 1 | 5 | 6 |   |

Figure 16:
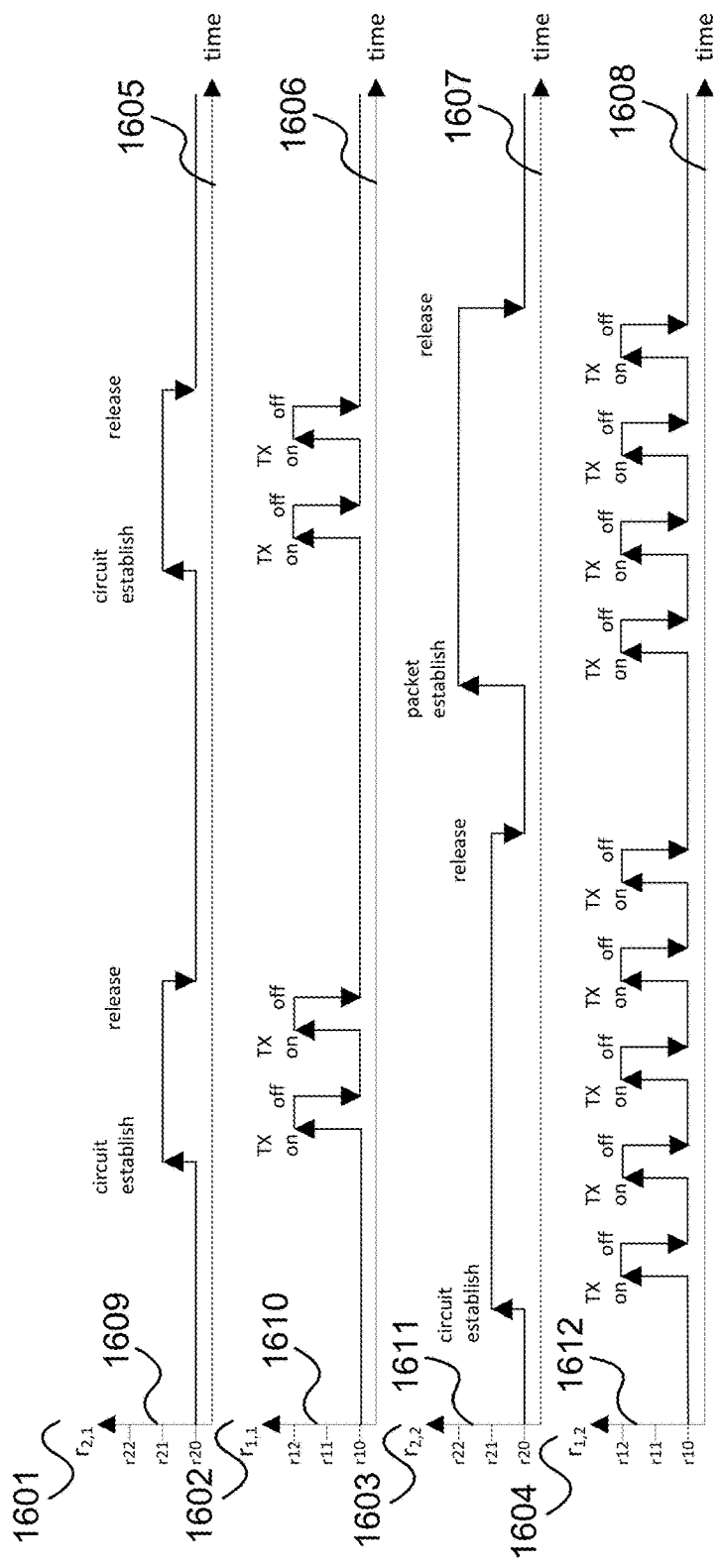
FIG. 16 shows an example for the timing sequences of connection layer requests of the first SIM, of physical layer requests of the first SIM, of connection layer requests of the second SIM and of physical layer requests of the second SIM of FIG. 15.

FIG. 16 shows an example for the timing sequences of connection layer requests of the first SIM in a first diagram 1601, of physical layer requests of the first SIM in a second diagram 1602, of connection layer requests of the second SIM in a third diagram 1603 and of physical layer requests of the second SIM in a fourth diagram 1604.

For simplicity, reception requests of the physical layer 1501 have not been considered.

Time increases from left to right along the horizontal axes 1605 to 1608 and the requests are indicated in accordance with the vertical axes 1609 to 1612.

Figure 17:
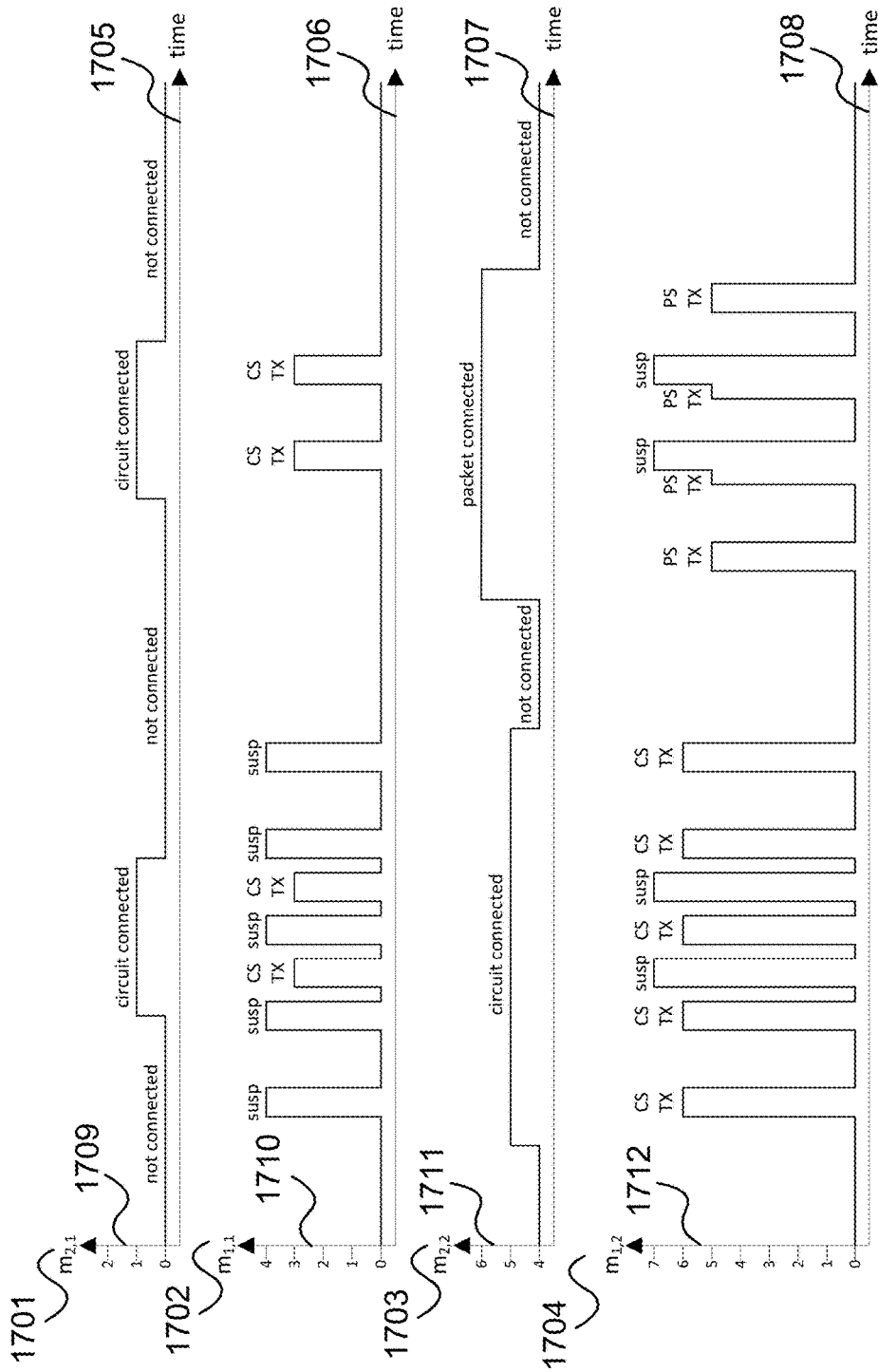
FIG. 17 shows the resulting connection layer metric values of the first SIM, the resulting physical layer metric values of the first SIM, the resulting connection layer metric values of the second SIM and the resulting physical layer metric values of the second SIM.

FIG. 17 shows the resulting connection layer metric values of the first SIM in a first diagram 1701, the resulting physical layer metric values of the first SIM in a second diagram 1702, the resulting connection layer metric values of the second SIM in a third diagram 1703 and the resulting physical layer metric values of the second SIM in a fourth diagram 1704.

Time increases from left to right along the horizontal axes 1705 to 1708 in accordance with the same time scale as in FIG. 16 and the metric values are indicated in accordance with the vertical axes 1709 to 1712 in accordance with tables 13 and 14.

Figure 18:
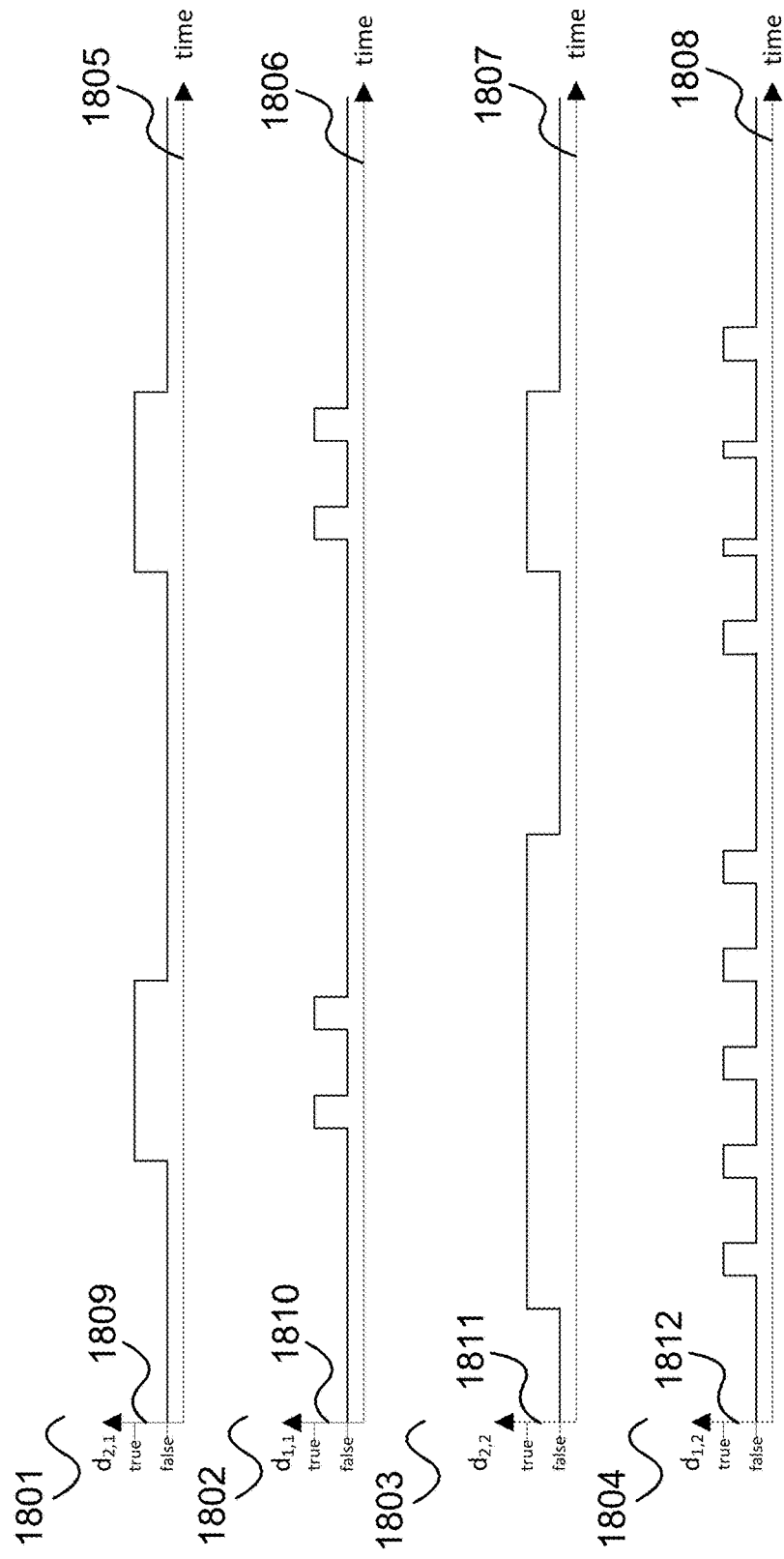
FIG. 18 shows resulting values of the allocation decision function of the connection layer of the first SIM, of the physical layer of the first SIM, of the connection layer of the second SIM and of the physical layer of the second SIM.

FIG. 18 shows resulting values of the allocation decision function of the connection layer of the first SIM in a first diagram 1801, of the physical layer of the first SIM in a second diagram 1802, of the connection layer of the second SIM in a third diagram 1803 and of the physical layer of the second SIM in a fourth diagram 1804.

Time increases from left to right along the horizontal axes 1805 to 1808 in accordance with the same time scale as in FIGS. 16 and 17 and the decision function values are indicated in accordance with the vertical axes 1809 to 1812 in accordance with tables 13 and 14.

It can be seen from the diagrams of FIGS. 16 to 18 that resource availability of the higher layers is a priori granted.

Figure 19:
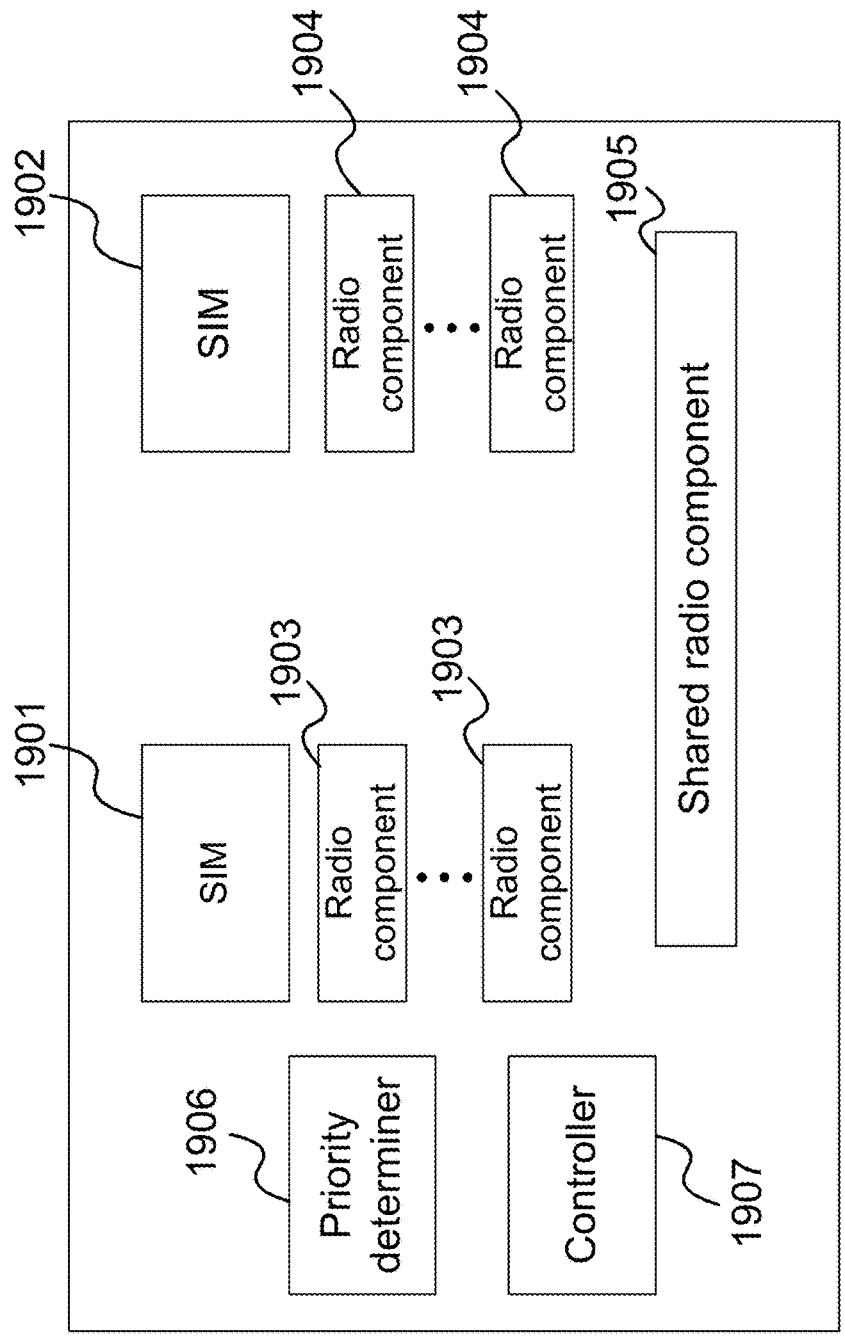
FIG. 19 shows a communication terminal.

In summary, according to various examples, a communication device is provided as illustrated in FIG. 19.

FIG. 19 shows a communication terminal 1900.

The communication terminal 1900 includes a first subscriber identity module 1901, a second subscriber identity module 1902, a first plurality of radio communication components 1903 assigned to the first subscriber identity module 1901 and a second plurality of radio communication components 1904 assigned to the second subscriber identity module 1902 and a shared radio communication component 1905 assigned to both the first subscriber identity module 1901 and the second subscriber identity module 1902.

The communication terminal 1900 further includes a priority determiner 1906 configured to determine, for each radio communication component of the first plurality of radio communication components a priority of a function to be carried by the radio communication component using the shared radio communication component and determine an accumulated priority for the first subscriber identity module based on the priorities determined for the first plurality of radio communication components and to determine, for each radio communication component of the second plurality of radio communication components a priority of a function to be carried by the radio communication component using the shared radio communication component and determine an accumulated priority for the second subscriber identity module based on the priorities determined for the second plurality of radio communication components.

Further, the communication terminal 1900 includes a controller 1907 configured to give access to the shared radio communication component based on the accumulated priorities.

In other words, according to various examples, in a communication terminal, e.g. a mobile phone, a priority is accumulated over a plurality of (e.g. higher layer) components and used as a basis for the decision regarding the access to a shared component. Each component of the second plurality of components may perform a certain function, e.g. in context of a task to be carried out for the respective SIM and this function may be associated with a priority. For example, a NAS component of the first SIM may trigger a location area update which is associated with a certain priority (wherein the location area update may be seen as the task and the corresponding processing in the NAS as the function of the NAS while the transmission of corresponding data in the physical layer may be seen as the function of the physical layer belonging to this task). The priority of the function may be used to modify an initial priority value (e.g. 0) and the priority may be further modified while it is being handed down (from a layer perspective) to the shared resource, e.g. a shared transceiver. For example, a priority may be modified in layer 1 by a physical channel priority if a certain physical channel is to be used for a certain task, such as a useful data transmission (e.g. in context of a call), paging reception, location area update, cell measurement, cell search etc. For example, a paging for the first SIM may result in a higher accumulated priority than a data transmission for a call for the second SIM such that transceiver usage is granted to the first SIM and the paging is performed. However, priorities may increase over time. For example, the priority for a location area update for the first SIM may increase over time if a location area update has not been performed for some time (due to transceiver access having been granted to the second SIM) and the communication terminal risks losing attachment to the network if a location area update is not performed soon.

It should be noted that the priority determiner 1906 may be implemented as two components which are independent from each other, i.e. wherein one component determines the priorities of the functions and the accumulated priority for the first plurality of communication components and the second component determines the priorities of the functions and the accumulated priority for the second plurality of communication components. These means that each component only communicates with (e.g. higher layer hardware and software) components of only one SIM. A communication between the two components may then take place (e.g. in the form of a comparison of the two accumulated priorities) at the level of the shared component.

According to some examples, in other words, multiple modems or protocol stacks are kept as independent as possible and a conflict regarding a shared resource can be seen to be solved at a single point (e.g. a single layer). This single point is usually where the conflict occurs e.g. at the shared resource, e.g. a layer component. The arbitration is controlled by priority levels according to suitable rules by each modem without any information from the other modem or protocol stack (or modems/protocol stacks). The priority levels are a superposition of decisions by all or a subset of the different layers within a modem's protocol stack. At the point of conflict these independently calculated priority levels are compared and the instance (i.e. modem instance or protocol stack instance) with the highest level gets the resource. This approach can easily be generalized to a case of any number of resources, which is lower than the number of requestors.

The components of the communication device (e.g. the subscriber identity modules, the radio components and the priority determiner) may for example be implemented by one or more circuits. A "circuit" may be understood as any kind of a logic implementing entity, which may be special purpose circuitry or a processor executing software stored in a memory, firmware, or any combination thereof. Thus a "circuit" may be a hard-wired logic circuit or a programmable logic circuit such as a programmable processor, e.g. a microprocessor. A "circuit" may also be a processor executing software, e.g. any kind of computer program. Any other kind of implementation of the respective functions which will be described in more detail below may also be understood as a "circuit".

Figure 20:
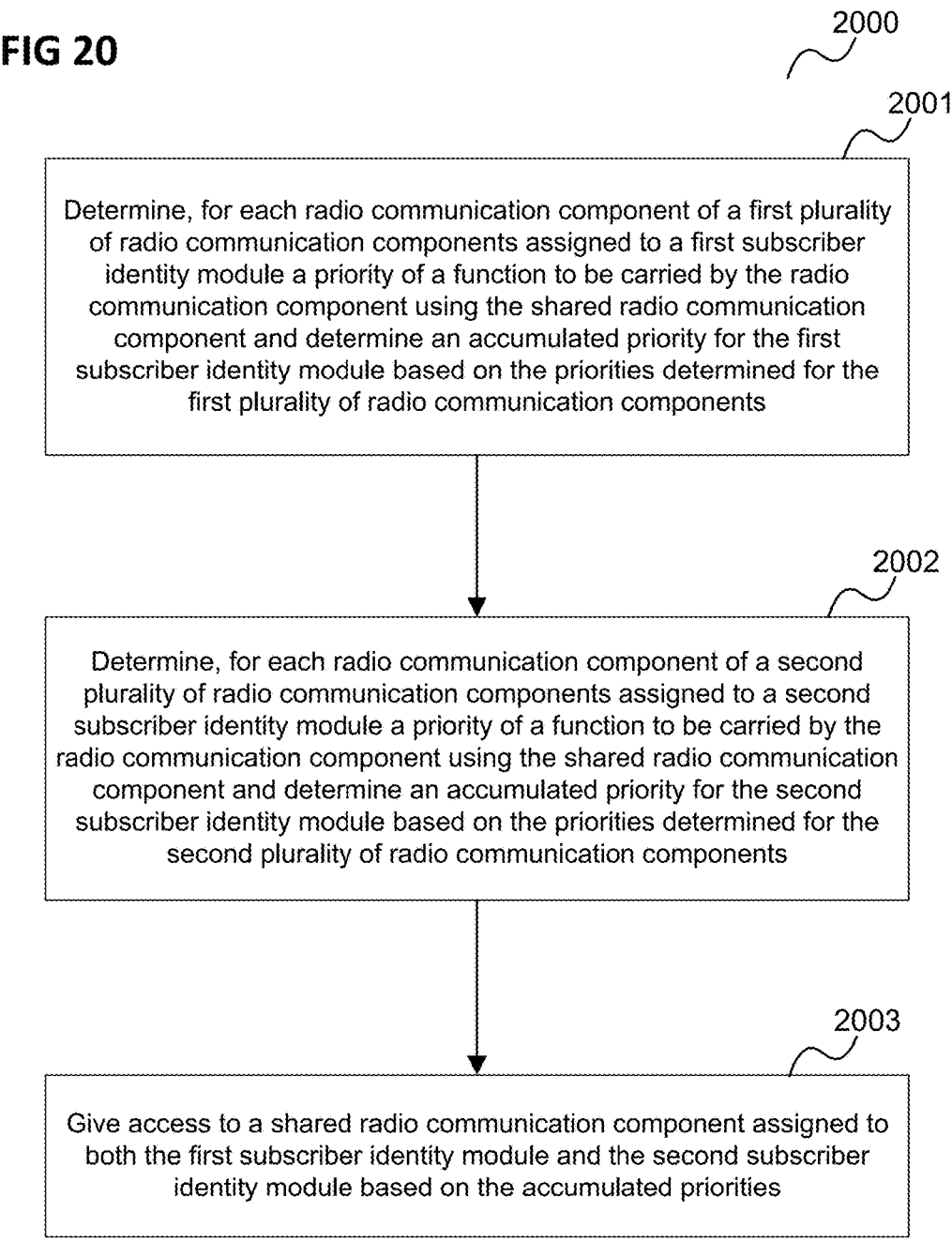
FIG. 20 shows a flow diagram illustrating a method for using a shared radio communication component.

The communication terminal 1900 for example carries out a method as illustrated in FIG. 20.

FIG. 20 shows a flow diagram 2000 illustrating for using a shared radio communication component, for example carried out by a communication terminal.

In 2001, the communication terminal determines, for each radio communication component of a first plurality of radio communication components assigned to a first subscriber identity module a priority of a function to be carried by the radio communication component using the shared radio communication component and determine an accumulated priority for the first subscriber identity module based on the priorities determined for the first plurality of radio communication components;

In 2002, the communication terminal determines, for each radio communication component of a second plurality of radio communication components assigned to a second subscriber identity module a priority of a function to be carried by the radio communication component using the shared radio communication component and determine an accumulated priority for the second subscriber identity module based on the priorities determined for the second plurality of radio communication components; and In 2003, the communication terminal gives access to a shared radio communication component assigned to both the first subscriber identity module and the second subscriber identity module based on the accumulated priorities.

The following examples pertain to further embodiments.

Example 1 is a communication terminal as described with reference to FIG. 19.

In Example 2, the subject-matter of Example 1 may optionally include the functions to be carried out by the first plurality of radio communication components being part of a task to be carried out for the first subscriber identity module.

In Example 3, the subject-matter of Example 2 may optionally include the task being a task to be carried out for a camping of the communication terminal on a radio cell by means of the first subscriber identity module or a transmission of useful data of the communication terminal by means of the first subscriber identity module.

In Example 4, the subject-matter of any one of Examples 2-3 may optionally include one of radio communication components of the first plurality of radio communication components being configured to trigger the task to be carried out for the first subscriber identity module.

In Example 5, the subject-matter of any one of Examples 1-4 may optionally include the functions to be carried out by the second plurality of radio communication components being part of a task to be carried out for the second subscriber identity module.

In Example 6, the subject-matter of Example 5 may optionally include the task being a task to be carried out for a camping of the communication terminal on a radio cell by means of the second subscriber identity module or a transmission of useful data of the communication terminal by means of the second subscriber identity module.

In Example 7, the subject-matter of any one of Examples 5-6 may optionally include one of radio communication components of the second plurality of radio communication components being configured to trigger the task to be carried out for the second subscriber identity module.

In Example 8, the subject-matter of any one of Examples 1-7 may optionally include the first subscriber identity module being configured to perform radio communication tasks using a first protocol stack instance at least partially implemented by means of the first plurality of radio communication components and the second subscriber identity module being configured to perform radio communication tasks using a second protocol stack instance at least partially implemented by means of the second plurality of radio communication components.

In Example 9, the subject-matter of any one of Examples 8—may optionally include the first plurality of radio communication components and the second plurality of radio communication components being at least partially implemented by means of a processor.

In Example In Example 10, the subject-matter of any one of Examples 1-9 may optionally include the first plurality of radio communication components at least partially implementing a modem for the first subscriber identity module and the second plurality of radio communication components at least partially implementing a modem for the second subscriber identity module.

In Example 11, the subject-matter of any one of Examples 1-10 may optionally include the shared component being part of a first communication layer and at least some of first plurality of radio communication components and at least some of the second plurality of radio communication components being part of at least one second communication layer above the first communication layer.

In Example 12, the subject-matter of Example 11 may optionally include the first communication layer being a physical layer and the at least one second communication layer including at least one of the data link layer and the network layer.

In Example 13, the subject-matter of any one of Examples 1-12 may optionally include the shared component being part of a first communication layer and the first plurality of radio communication components and the second plurality of radio communication components being part of the first communication layer or at least one second communication layer above the first communication layer.

In Example 14, the subject-matter of any one of Examples 1-13 may optionally include the shared radio communication component being assigned to both the first subscriber identity module and the second subscriber identity module comprising the shared radio communication component being required for a radio communication connection of the first subscriber identity module and being required for a radio communication connection of the second subscriber identity module.

In Example 15, the subject-matter of Example 14 may optionally include the radio communication connection of the first subscriber identity module and the radio communication connection of the second subscriber identity module being radio communication connections to a radio communication network.

In Example 16, the subject-matter of any one of Examples 1-15 may optionally include the shared component being a physical layer component.

In Example 17, the subject-matter of any one of Examples 1-16 may optionally include the shared component being a hardware component of the communication terminal.

In Example 18, the subject-matter of any one of Examples 1-19 may optionally include the shared component being a transceiver of the communication terminal.

In Example 19, the subject-matter of any one of Examples 1-18 may optionally include the priority determiner being configured to determine the accumulated priority for the first subscriber identity module by starting with an initial value for the accumulated priority for the first subscriber identity module and by successively modifying it based on the priorities determined for the first plurality of radio communication components and the priority determiner being configured to determine the accumulated priority for the second subscriber identity module by starting with an initial value for the accumulated priority for the second subscriber identity module and by successively modifying it based on the priorities determined for the second plurality of radio communication components.

In Example 20, the subject-matter of any one of Examples 1-19 may optionally include the controller being configured to compare the accumulated priority for the first subscriber identity module and the accumulated priority for the second subscriber identity module and giving access to the shared radio communication component to the subscriber identity module with the higher accumulated priority.

In Example 21, the subject-matter of any one of Examples 1-20 may optionally include at least one further subscriber identity module.

In Example 22 being a method for using a shared radio communication component as described with reference to FIG. 20.

In Example 23, the subject-matter of Example 22 may optionally include the functions to be carried out by the first plurality of radio communication components being part of a task to be carried out for the first subscriber identity module.

In Example 24, the subject-matter of Example 23 may optionally include the task being a task to be carried out for a camping of the communication terminal on a radio cell by means of the first subscriber identity module or a transmission of useful data of the communication terminal by means of the first subscriber identity module.

In Example 25, the subject-matter of any one of Examples 23-24 may optionally include one of radio communication components of the first plurality of radio communication components triggering the task to be carried out for the first subscriber identity module.

In Example 26, the subject-matter of any one of Examples 22-25 may optionally include the functions to be carried out by the second plurality of radio communication components being part of a task to be carried out for the second subscriber identity module.

In Example 27, the subject-matter of Example 26 may optionally include the task being a task to be carried out for a camping of a communication terminal on a radio cell by means of the second subscriber identity module or a transmission of useful data of the communication terminal by means of the second subscriber identity module.

In Example 28, the subject-matter of any one of Examples 26-27 may optionally include one of radio communication components of the second plurality of radio communication components triggering the task to be carried out for the second subscriber identity module.

In Example 29, the subject-matter of any one of Examples 22-28 may optionally include the first subscriber identity module performing radio communication tasks using a first protocol stack instance at least partially implemented by means of the first plurality of radio communication components and the second subscriber identity module performing radio communication tasks using a second protocol stack instance at least partially implemented by means of the second plurality of radio communication components.

In Example 30, the subject-matter of Example 29 may optionally include the first plurality of radio communication components and the second plurality of radio communication components being at least partially implemented by means of a processor.

In Example 31, the subject-matter of any one of Examples 22-30 may optionally include the first plurality of radio communication components at least partially implementing a modem for the first subscriber identity module and the second plurality of radio communication components at least partially implementing a modem for the second subscriber identity module.

In Example 32, the subject-matter of any one of Examples 22-31 may optionally include the shared component being part of a first communication layer and at least some of first plurality of radio communication components and at least some of the second plurality of radio communication components being part of at least one second communication layer above the first communication layer.

In Example 33, the subject-matter of any one of Examples 22-32 may optionally include the first communication layer being a physical layer and the at least one second communication layer including at least one of the data link layer and the network layer.

In Example 34, the subject-matter of any one of Examples 21-33 may optionally include the shared component being part of a first communication layer and the first plurality of radio communication components and the second plurality of radio communication components being part of the first communication layer or at least one second communication layer above the first communication layer.

In Example 35, the subject-matter of any one of Examples 21-34 may optionally include the shared radio communication component being assigned to both the first subscriber identity module and the second subscriber identity module comprising the shared radio communication component being required for a radio communication connection of the first subscriber identity module and being required for a radio communication connection of the second subscriber identity module.

In Example 36, the subject-matter of Example 35 may optionally include the radio communication connection of the first subscriber identity module and the radio communication connection of the second subscriber identity module being radio communication connections to a radio communication network.

In Example 37, the subject-matter of any one of Examples 22-36 may optionally include the shared component being a physical layer component.

In Example 38, the subject-matter of any one of Examples 22-37 may optionally include the shared component being a hardware component of a communication terminal.

In Example 39, the subject-matter of any one of Examples 22-38 may optionally include the shared component being a transceiver of a communication terminal.

In Example 40, the subject-matter of any one of Examples 22-39 may optionally include determining the accumulated priority for the first subscriber identity module by starting with an initial value for the accumulated priority for the first subscriber identity module and by successively modifying it based on the priorities determined for the first plurality of radio communication components and comprising determining the accumulated priority for the second subscriber identity module by starting with an initial value for the accumulated priority for the second subscriber identity module and by successively modifying it based on the priorities determined for the second plurality of radio communication components.

In Example 41, the subject-matter of any one of Examples 22-40 may optionally include comparing the accumulated priority for the first subscriber identity module and the accumulated priority for the second subscriber identity module and giving access to the shared radio communication component to the subscriber identity module with the higher accumulated priority.

In Example 42, the subject-matter of any one of Examples 22-41, performed by a communication terminal comprising the first subscriber identity module, the second subscriber identity module and at least one further subscriber identity module.

Example 43 is a computer readable medium having recorded instructions thereon which, when executed by a processor, make the processor perform a method for using a shared radio communication component according to any one of Examples 22 to 42.

According to a further embodiment, a communication terminal is provided comprising a first subscriber identity module, a second subscriber identity module and for each communication layer of a plurality of communication layers, at least one component of the communication layer, wherein, for a first communication layer of the plurality of communication layers, a component of the first communication layer is assigned to both the first subscriber identity module and the second subscriber identity module, wherein, for at least one second communication layer of the plurality of communication layers above the first communication layer, a first component of the second communication layer is assigned to the first subscriber identity module and a second component of the second communication layer is assigned to the second subscriber identity module. The communication terminal further comprises a priority determiner configured to determine, for each second communication layer and for each of the first subscriber identity module and the second subscriber identity module, a priority of a function to be carried out by the second communication layer for the subscriber identity module, determine, for each of the first subscriber identity module and the second subscriber identity module an accumulated priority based on the priorities determined for the subscriber identity module. Further, the communication terminal comprises a controller configured to give access to the component of the first communication layer to the first subscriber identity module or the second subscriber identity module based on the accumulated priorities.

It should be noted that one or more of the features of any of the examples above may be combined with any one of the other examples.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

The invention claimed is:
1. A communication terminal comprising:
   a first subscriber identity module;
   a second subscriber identity module;
   a first plurality of radio communication components assigned to the first subscriber identity module;
   a second plurality of radio communication components assigned to the second subscriber identity module;
   wherein inter-subscriber identity module communication between the first subscriber module and the second subscriber module only occurs for a lowest layer;
   a shared radio communication component assigned to both the first subscriber identity module and the second subscriber identity module;
   a priority determiner circuit configured to:
      determine, for each radio communication component of the first plurality of radio communication components, a priority of a function to be carried by the radio communication component using the shared radio communication component and determine an accumulated priority for the first subscriber identity module based on the priorities determined for the first plurality of radio communication components;

determine, for each radio communication component of the second plurality of radio communication components, a priority of a function to be carried by the radio communication component using the shared radio communication component and determine an accumulated priority for the second subscriber identity module based on the priorities determined for the second plurality of radio communication components; and a controller circuit configured to give access to the shared radio communication component based on the accumulated priorities.

2. The communication terminal of claim 1, wherein the functions to be carried out by the first plurality of radio communication components are part of a task to be carried out for the first subscriber identity module.

3. The communication terminal of claim 2, wherein the task is a task to be carried out for a camping of the communication terminal on a radio cell by means of the first subscriber identity module or a transmission of useful data of the communication terminal by means of the first subscriber identity module.

4. The communication terminal of claim 2, wherein one of radio communication components of the first plurality of radio communication components is configured to trigger the task to be carried out for the first subscriber identity module.

5. The communication terminal of claim 1, wherein the functions to be carried out by the second plurality of radio communication components are part of a task to be carried out for the second subscriber identity module.

6. The communication terminal of claim 5, wherein the task is a task to be carried out for a camping of the communication terminal on a radio cell by means of the second subscriber identity module or a transmission of useful data of the communication terminal by means of the second subscriber identity module.

7. The communication terminal of claim 5, wherein one of radio communication components of the second plurality of radio communication components is configured to trigger the task to be carried out for the second subscriber identity module.

8. The communication terminal of claim 1, wherein the first subscriber identity module is configured to perform radio communication tasks using a first protocol stack instance at least partially implemented by means of the first plurality of radio communication components and wherein the second subscriber identity module is configured to perform radio communication tasks using a second protocol stack instance at least partially implemented by means of the second plurality of radio communication components.

9. The communication terminal of claim 8, wherein the first plurality of radio communication components and the second plurality of radio communication components are at least partially implemented by means of a processor.

10. The communication terminal of claim 1, wherein the first plurality of radio communication components at least partially implement a modem for the first subscriber identity module and the second plurality of radio communication components at least partially implement a modem for the second subscriber identity module.

11. The communication terminal of claim 1, wherein the shared component is part of a first communication layer and at least some of first plurality of radio communication components and at least some of the second plurality of radio communication components are part of at least one second communication layer above the first communication layer.

12. The communication terminal of claim 11, wherein the first communication layer is a physical layer and wherein the at least one second communication layer includes at least one of a data link layer and a network layer; and wherein the lowest layer is the physical layer.

13. The communication terminal of claim 1, wherein the shared component is part of a first communication layer and the first plurality of radio communication components and the second plurality of radio communication components are part of the first communication layer or at least one second communication layer above the first communication layer.

14. The communication terminal of claim 1, wherein the shared radio communication component being assigned to both the first subscriber identity module and the second subscriber identity module comprises the shared radio communication component being required for a radio communication connection of the first subscriber identity module and being required for a radio communication connection of the second subscriber identity module.

15. The communication terminal of claim 14, wherein the radio communication connection of the first subscriber identity module and the radio communication connection of the second subscriber identity module are radio communication connections to a radio communication network.

16. The communication terminal of claim 1, wherein the shared component is a physical layer component.

17. The communication terminal of claim 1, wherein the shared component is a hardware component of the communication terminal.

18. The communication terminal of claim 1, wherein the shared component is a transceiver of the communication terminal.

19. A method for using a shared radio communication component comprising:

determining, for each radio communication component of a first plurality of radio communication components assigned to a first subscriber identity module a priority of a function to be carried by the radio communication component using the shared radio communication component and determine an accumulated priority for the first subscriber identity module based on the priorities determined for the first plurality of radio communication components;

determining, for each radio communication component of a second plurality of radio communication components assigned to a second subscriber identity module, a priority of a function to be carried by the radio communication component using the shared radio communication component and determine an accumulated priority for the second subscriber identity module based on the priorities determined for the second plurality of radio communication components; wherein inter-subscriber identity module communication between the first subscriber module and the second subscriber module only occurs for a lowest layer; and giving access to a shared radio communication component assigned to both the first subscriber identity module and the second subscriber identity module based on the accumulated priorities.

20. A non-transitory computer readable medium having recorded instructions thereon which, when executed by a processor, make the processor perform a method for using a shared radio communication component according to claim 19.

* * * * *